United States Patent
Xu et al.

(10) Patent No.: US 10,313,949 B2
(45) Date of Patent: Jun. 4, 2019

(54) METHOD FOR HANDOVER IN WIRELESS COMMUNICATIONS SYSTEM AND APPARATUS SUPPORTING THE SAME

(71) Applicant: Samsung Electronics Co., Ltd., Suwon-si, Gyeonggi-do (KR)

(72) Inventors: Jiangwei Xu, Suwon-si (KR); Jin-Hyoung Kim, Seongnam-si (KR); Jin-Ho Lee, Seoul (KR); Hyun-Joo Lee, Seoul (KR); Krishna Manohar Singh, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 11 days.

(21) Appl. No.: 15/264,149

(22) Filed: Sep. 13, 2016

(65) Prior Publication Data

US 2017/0086119 A1 Mar. 23, 2017

(30) Foreign Application Priority Data

Sep. 18, 2015 (KR) ........................ 10-2015-0132159

(51) Int. Cl.
*H04W 36/14* (2009.01)
*H04W 36/30* (2009.01)
(Continued)

(52) U.S. Cl.
CPC ............ *H04W 36/30* (2013.01); *H04W 36/18* (2013.01); *H04W 88/06* (2013.01)

(58) Field of Classification Search
None
See application file for complete search history.

(56) References Cited

U.S. PATENT DOCUMENTS

| 8,886,195 B2 | 11/2014 | Srinivasan et al. |
| 2001/0004597 A1 | 6/2001 | Hirahara |
| (Continued) | | |

FOREIGN PATENT DOCUMENTS

| KR | 10-2009-0043734 A | 5/2009 |
| KR | 10-2012-0026441 A | 3/2012 |
| (Continued) | | |

OTHER PUBLICATIONS

Shokri-Ghadikolaei et al.; Millimeter Wave Cellular Networks: A MAC Layer Perspective; IEEE Transactions on Communications; Jul. 14, 2015; vol. 63, No. 10; IEEE.
(Continued)

*Primary Examiner* — Duc T Duong
(74) *Attorney, Agent, or Firm* — Jefferson IP Law, LLP

(57) ABSTRACT

The present disclosure relates to a pre-5th-Generation (5G) or 5G communication system to be provided for supporting higher data rates Beyond 4th-Generation (4G) communication system such as Long Term Evolution (LTE). A method for performing a handover by a terminal in a wireless communication system is provided. The method includes measuring a signal quality of a first network and determining whether the handover is required based on the signal quality of the first network, when the handover is determined to be required, communicating data through both a connection with the first network and a connection with a second network during a delay period and measuring the signal quality of the first network, when the delay period ends, determining whether to perform the handover based on the signal quality of the first network at a time when the delay period ends, and performing the handover.

20 Claims, 35 Drawing Sheets

(51) Int. Cl.
*H04W 36/36* (2009.01)
*H04W 88/06* (2009.01)
*H04W 36/18* (2009.01)

(56) References Cited

U.S. PATENT DOCUMENTS

| | | | |
|---|---|---|---|
| 2006/0240828 A1* | 10/2006 | Jain | H04L 43/0829 455/436 |
| 2010/0062773 A1 | 3/2010 | Yokota | |
| 2011/0182221 A1 | 7/2011 | Arakawa | |
| 2012/0202556 A1* | 8/2012 | Mori | H04W 36/30 455/525 |
| 2012/0281558 A1 | 11/2012 | Anderson et al. | |
| 2013/0170389 A1 | 7/2013 | Jee et al. | |
| 2015/0011212 A1* | 1/2015 | Andrei | H04W 4/02 455/436 |
| 2015/0065133 A1* | 3/2015 | Cui | H04W 36/22 455/436 |
| 2015/0181497 A1* | 6/2015 | Sane | H04W 36/30 370/331 |
| 2016/0037426 A1* | 2/2016 | Li | H04W 36/0094 370/332 |
| 2016/0165605 A1* | 6/2016 | Dimou | H04B 7/0617 370/329 |
| 2016/0198364 A1* | 7/2016 | Schwarzbauer | H04W 28/08 370/331 |
| 2016/0360464 A1 | 12/2016 | Han et al. | |
| 2017/0086199 A1* | 3/2017 | Zhang | H04W 24/02 |
| 2017/0272998 A1* | 9/2017 | Choi | H04W 76/10 |
| 2017/0332300 A1 | 11/2017 | Choi et al. | |
| 2017/0374703 A1* | 12/2017 | Sang | H04W 76/025 |

FOREIGN PATENT DOCUMENTS

| | | |
|---|---|---|
| WO | 2015/037937 A1 | 3/2015 |
| WO | 2015/109153 A1 | 7/2015 |
| WO | 2015/123885 A1 | 8/2015 |
| WO | 2016/060502 A2 | 4/2016 |

OTHER PUBLICATIONS

Extended European Search Report dated Nov. 9, 2018, issued in a counterpart European application No. 16846884.1-1214/3342209.

* cited by examiner

METHOD FOR HANDOVER IN WIRELESS COMMUNICATIONS SYSTEM AND APPARATUS SUPPORTING THE SAME

CROSS-REFERENCE TO RELATED APPLICATION(S)

This application claims the benefit under 35 U.S.C. § 119(a) of a Korean patent application filed on Sep. 18, 2015 in the Korean Intellectual Property Office and assigned Serial No. 10-2015-0132159, the entire disclosure of which is hereby incorporated by reference.

TECHNICAL FIELD

The present disclosure relates to handover methods by terminals in wireless communication systems. More particularly, the present disclosure relates to methods for performing a quick handover by terminals and methods for supporting a high data transmission rate upon a handover.

BACKGROUND

To meet the demand for wireless data traffic having increased since deployment of 4G (4th-Generation) communication systems, efforts have been made to develop an improved 5G (5th-Generation) or pre-5G communication system. Therefore, the 5G or pre-5G communication system is also called a 'beyond 4G network' or a 'post LTE system'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems.

In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

In the 5G system, hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

A handover refers to functionality allowing a terminal relocating from the service coverage of a base station to the service coverage of another base station to remain connected for service while syncing with a call channel assigned to the service coverage of the other base station. The term "handover" may also be referred to as "handoff."

A handover typically occurs when a terminal disconnects from a network currently in connection or switches the connection from the network to another network with a higher priority. This is described in greater detail with reference to the drawings.

FIG. 1 is a view illustrating an example in which a handover occurs as a terminal disconnects from a network according to the related art.

Referring to FIG. 1, the terminal 101 downloads contents 120 from its connecting server 102 through the network 1 103 (e.g., a wi-fi network) (110). For various reasons, the terminal 101 may disconnect from the network 1 103 (112). In this case, the terminal 101 might fail to receive all of the contents 120, and instead receive only some of the contents 122, through the network 1 103. The terminal 101 may not connect to the network 1 103 and discover other networks. When the terminal 101 discovers a network 2 104 (e.g., an LTE network), the terminal 101 attempts to establish a connection 114 with the network 2 104. When the terminal 101 connects with the network 2 104, the terminal 101 downloads the rest 126 of the contents 120.

FIG. 2 is a view illustrating an example in which a handover occurs as a terminal connects to a network with a higher priority than that of the network that the terminal is currently in connection with according to the related art.

Referring to FIG. 2, it is first assumed that the network 1 203 (e.g., a wi-fi network) is higher in priority than the network 2 204 (e.g., an LTE network). As described above in connection with FIG. 1, the terminal 201 likewise downloads contents 220 from its connecting server 202 through the network 2 204 (210). The terminal 201 may discover other networks while downloading the contents 220. When the terminal 201 discovers the network 1 203 with a higher priority than that of the network 2 204, the terminal 201 attempts to connect with the network 1 203 (212). When the terminal 201 connects with the network 1 203, the terminal 201 disconnects from the network 2 204 (214). When the terminal 201 downloaded only some 222 of the contents through the network 2 204, the terminal 201 downloads the remaining contents 226 through the network 1 203.

Such handover scheme releases connection with a current network before establishing a connection with a new network and is thus inefficient due to a reduction in data transmission rate upon handover. According to the present disclosure, there is suggested a handover method supportive of a high data transmission rate even during a handover.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a handover method supportive of a high data transmission rate upon handover and an apparatus for supporting the same.

Another aspect of the present disclosure is to provide a method for allowing a terminal to perform a quick handover.

In accordance with an aspect of the present disclosure, a method for performing a handover by a terminal in a wireless communication system is provided. The method includes measuring a signal quality of a first network and determining whether the handover is required based on the signal quality of the first network, when the handover is determined to be required, communicating data through both a connection with the first network and a connection with a second network during a delay period and measuring the signal quality of the first network, when the delay period ends, determining whether to perform the handover based on the signal quality of the first network at a time when the delay period ends, and performing the handover based on the determination of whether to perform the handover.

In accordance with another aspect of the present disclosure, a method for an apparatus supporting a handover in a wireless communication system is provided. The method includes measuring a signal quality of a first network, and determining whether the handover is required based on the signal quality of the first network, when the handover is determined to be required, communicating data through both a connection with the first network and a connection with a second network during a delay period and measuring the signal quality of the first network, when the delay period ends, determining whether to perform the handover based on the signal quality of the first network at a time when the delay period ends, and performing the handover based on the determination of whether to perform the handover.

In accordance with another aspect of the present disclosure, a terminal device for performing a handover in a wireless communication system is provided. The terminal device including at least one processor, and at least one memory storing one or more computer programs configured to be executed by the at least one processor, the one or more computer programs including instructions for measuring a signal quality of a first network, determining whether the handover is required based on the signal quality of the first network, when the handover is determined to be required, communicating data through both a connection with the first network and a connection with a second network during a delay period, measuring the signal quality of the first network, when the delay period ends, determining whether to perform the handover based on the signal quality of the first network at a time when the delay period ends, and performing the handover based on the determination of whether to perform the handover.

According to the present disclosure, the terminal may have a high data transmission rate even upon handover. Further, even when handover is frequent, the terminal may perform a handover at high speed.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
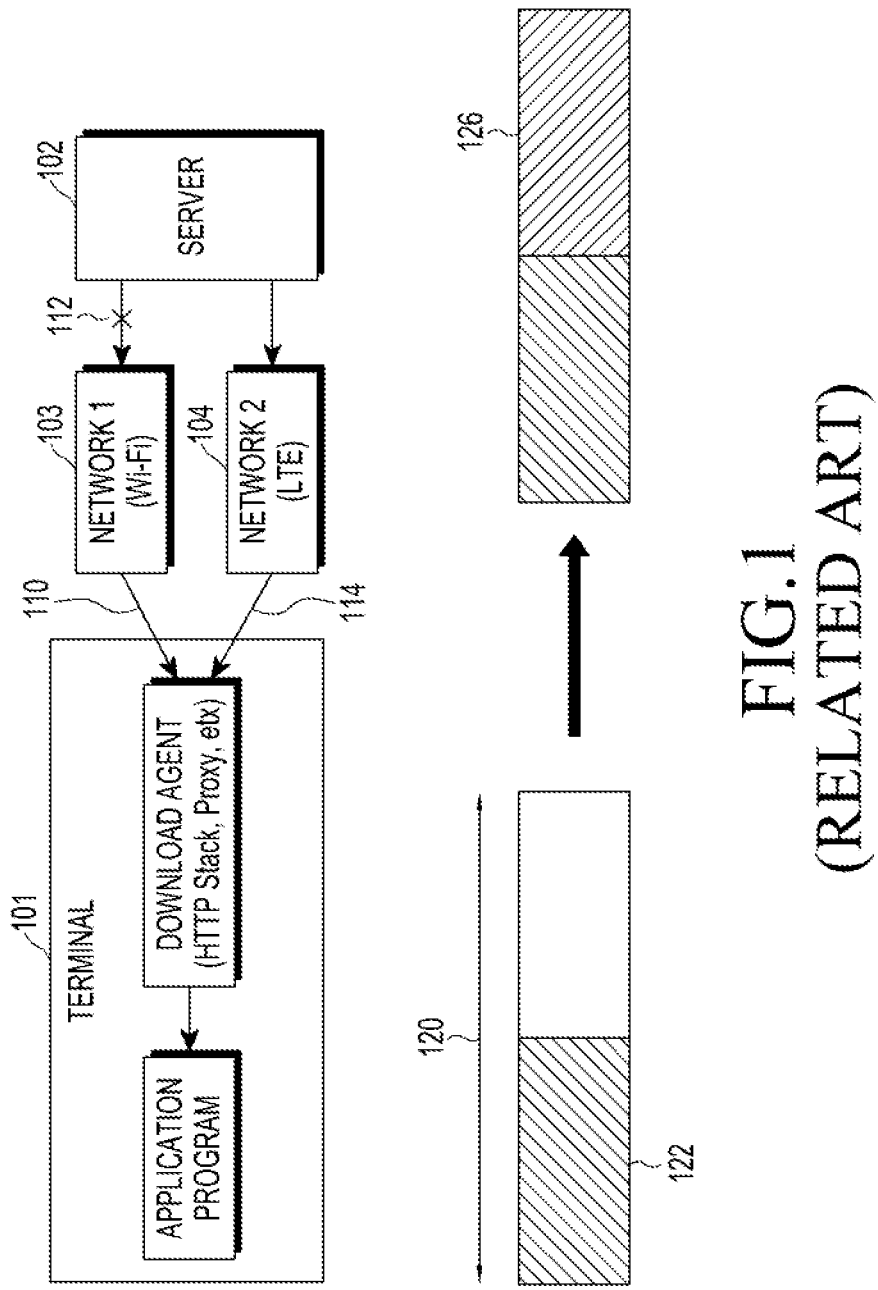
FIG. 1 is a view illustrating an example in which a handover occurs as a terminal disconnects from a network according to the related art.
Figure 2:
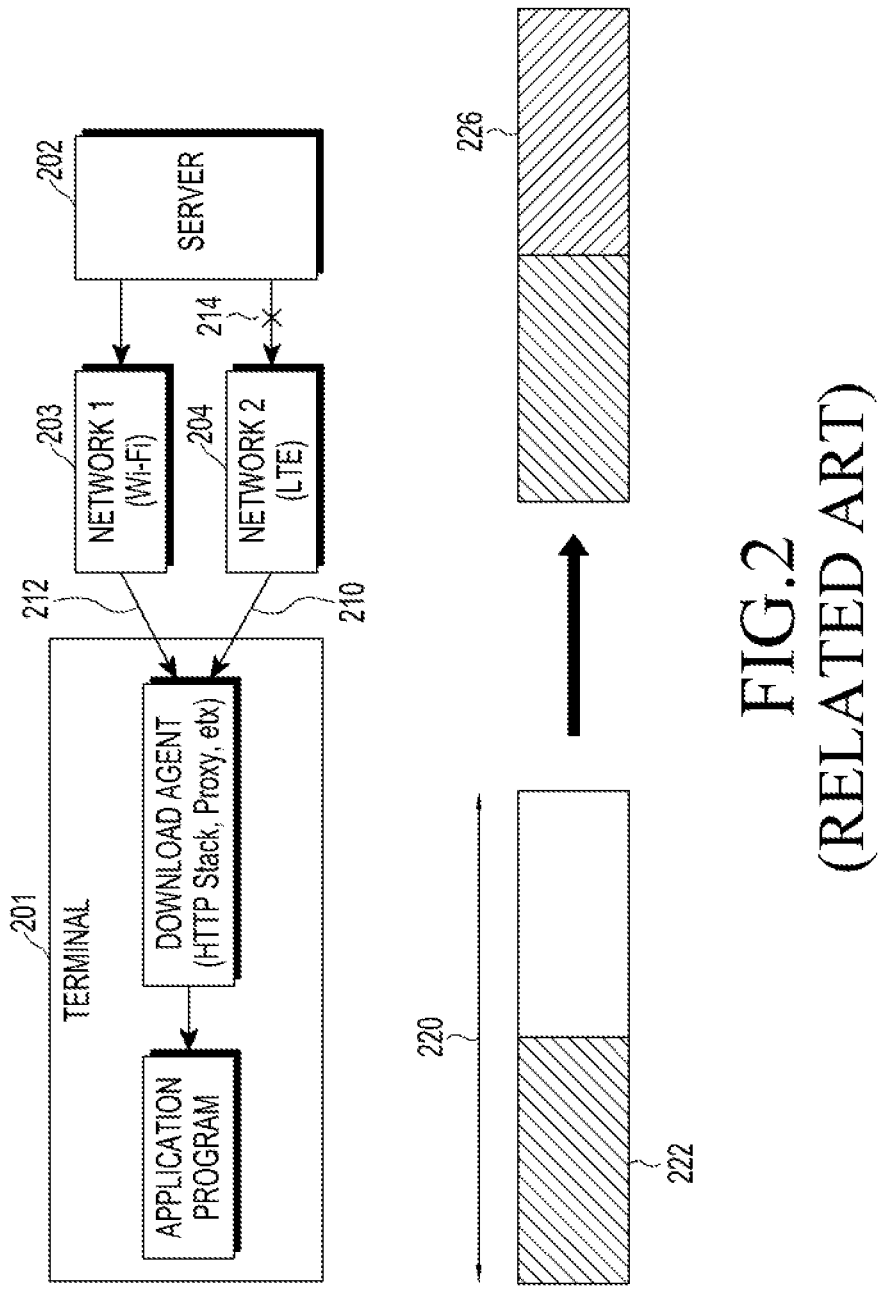
FIG. 2 is a view illustrating an example in which a handover occurs as a terminal connects to a network with a higher priority than that of the network that the terminal is currently in connection with according to the related art.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The terminal may include a user equipment (UE), a mobile station (MS), a cellular phone, a smartphone, a computer, or a multimedia system capable of performing communication functions.

Existing mobile communication technology has a higher chance of adopting millimeter wave (mmWave) bands, i.e., a 60 GHz band (57 GHz to 66 GHz), in further evolved schemes for next-generation communication. A mmWave band-supportive network (hereinafter, mmWave network) supports high data rate services but requires a relatively long initialization time as compared with other networks. Further, the mmWave network has relatively smaller and unstable service coverage and may easily lose connection with peripheral terminals by ambient interruptions. Thus, the terminal may require handover more frequently.

Although the mmWave network is described as an example, the present disclosure may also be applicable to other networks. In particular, the present disclosure may be efficiently applied to networks that require longer initialization time for network connections or may frequently lose connection with terminals due to unstable connectivity.

As used herein, a base station supportive of the mmWave network is denoted a mmWave base station, and a base station supportive of the long term evolution (LTE) network is denoted an LTE base station.

Regarding connection with a terminal, it is assumed herein that a mmWave network served by a mmWave base station is higher in priority than an LTE network served by an LTE base station.

FIGS. 3A, 3B, 3C, 4A, 4B, 4C, 5A, 5B, 6A, and 6B illustrate examples in which a handover occurs between an LTE network and a mmWave network.

Figure 3A:
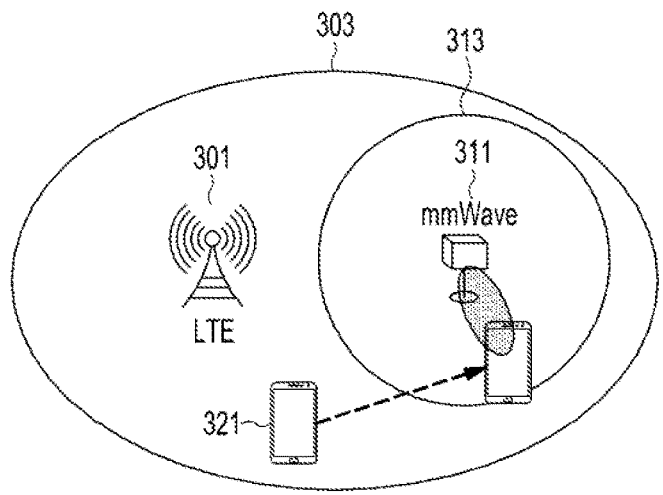
FIGS. 3A to 3C are views illustrating an example in which a handover occurs from a long term evolution (LTE) network served by an LTE base station to a millimeter wave (mmWave) network served by a mmWave base station according to an embodiment of the present disclosure.
Figure 3B:
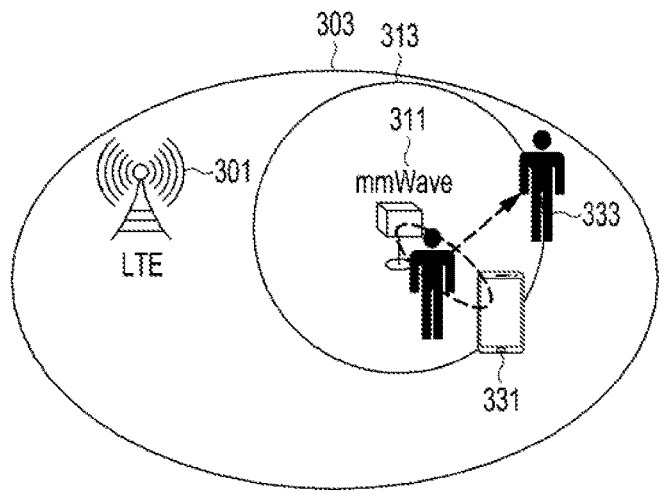
Figure 3C:
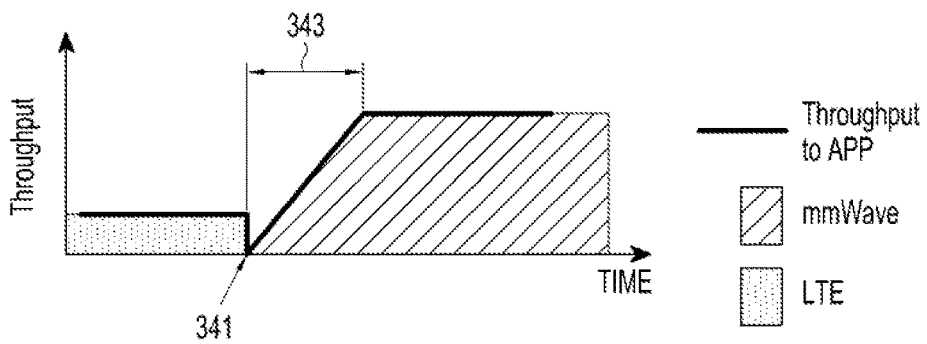

FIGS. 3A to 3C are views illustrating an example in which a handover occurs from an LTE network served by an LTE base station to a mmWave network served by a mmWave base station according to an embodiment of the present disclosure.

FIG. 3A illustrates an example in which a handover occurs as the terminal is on the move.

Referring to FIG. 3A, the terminal 321, present in the coverage area 303 served by the LTE base station 301, is connected to the LTE base station 301. When the terminal 321 enters the coverage area 313 servable by the mmWave base station 311, a handover to the mmWave network, which has a higher priority in connection, may occur.

FIG. 3B illustrates an example in which a handover occurs as an obstacle is removed.

Referring to FIG. 3B, the terminal 331 is present in the coverage area 313 servable by the LTE base station 301 and mmWave base station 311. Generally, the terminal 331 is connected to the mmWave network higher in priority than the LTE network. However, as there is an obstacle, e.g., a human being 333, as shown in FIG. 3B, the terminal 331 cannot receive services from the mmWave base station 311. The terminal 331 instead receives services from the LTE base station 301. Thereafter, when the human being 333 is on the move, the terminal 331 may receive services from the mmWave base station 311.

FIG. 3C illustrates data throughput in a network connected with the terminals 321 and 331 according to variations in time and the amount of data transmissions (simply referred to as throughputs) according thereto.

A handover from the LTE network to the mmWave network occurs in each of the terminal 321 of FIG. 3A and the terminal 331 of FIG. 3B. The data throughput for the terminal connected with the mmWave network is larger than the data throughput for the terminal connected with the LTE network. However, the throughput of the mmWave network is decreased at the moment 341 of connecting to the mmWave network because a connection with the mmWave network from the physical layer should be made. Further, a time 343 is required for the terminal to connect with the mmWave network to adjust the communication environment to the optimum and present the best data transmission speed. In other words, the data throughput gradually increases immediately after the terminal connects with the mmWave network. As such, a new connection being made to gradually increase data throughput from a lower level may be termed 'slow start.' Thus, the terminal suffers a deterioration of performance when a handover occurs.

Figure 4A:
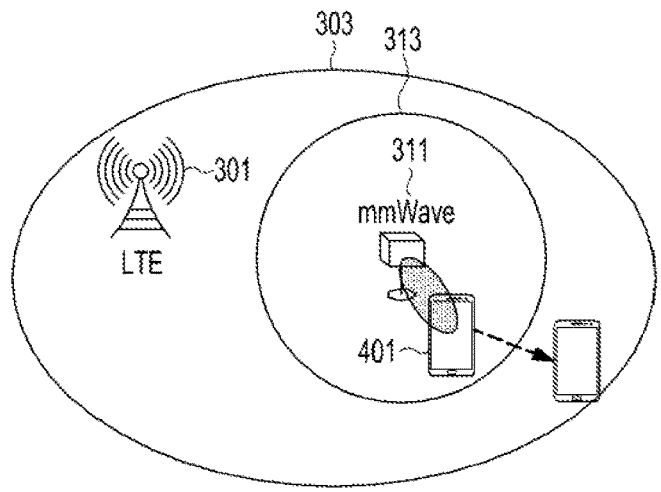
FIGS. 4A to 4C are views illustrating an example in which a handover occurs from a mmWave network to an LTE network according to an embodiment of the present disclosure.
Figure 4B:
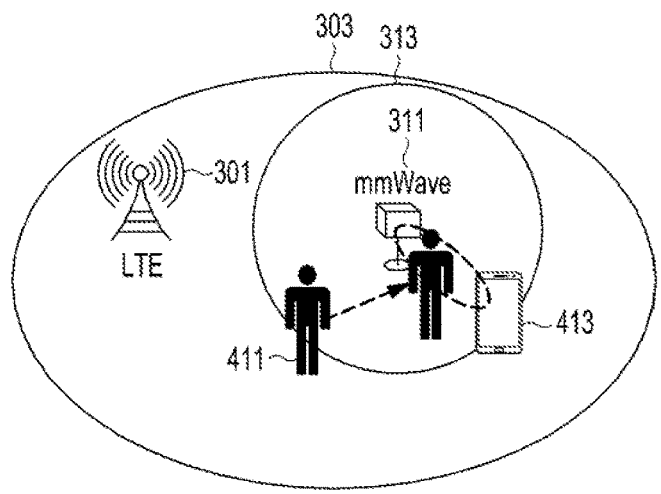
Figure 4C:
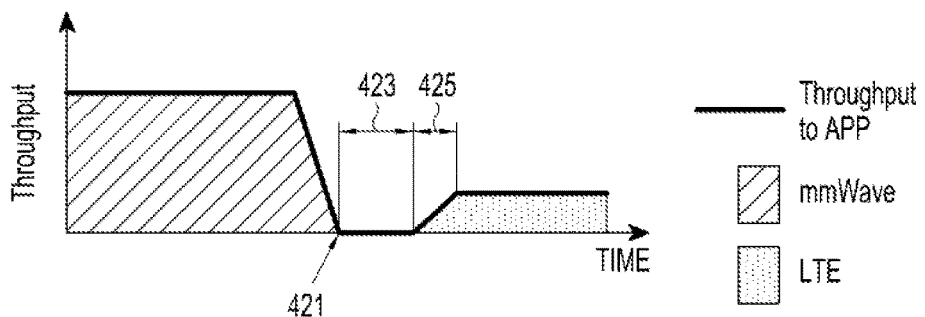

FIGS. 4A to 4C are views illustrating an example in which a handover occurs from a mmWave network to an LTE network according to an embodiment of the present disclosure.

FIG. 4A illustrates an example in which a handover occurs as the terminal is on the move.

Referring to FIG. 4A, the terminal 401 is present in the coverage area 313 servable by the LTE base station 301 and mmWave base station 311. The terminal 401 is connected to the mmWave network higher in priority of connection than the LTE network. Thereafter, when the terminal 401 moves from the service coverage area 313 of the mmWave network, a handover occurs from the mmWave network to the LTE network.

FIG. 4B illustrates an example in which a handover is caused by an obstacle.

Referring to FIG. 4B, the terminal 413 is positioned in the service coverage 313 of the mmWave network to receive services from the mmWave base station 311. When a human being 411, which is the obstacle, moves to result in the terminal 413 failing to receive services from the mmWave network, the terminal 413 receives services from the LTE network.

FIG. 4C illustrates data throughput in a network connected with the terminals 401 and 413 according to variations in time and the amount of data transmissions (simply referred to as throughputs) according thereto.

A handover from the mmWave network to the LTE network occurs in each of the terminal 401 of FIG. 4A and the terminal 413 of FIG. 4B. The terminals 401 and 413, upon disconnection from the mmWave network (421), search for the mmWave base station higher in priority for a predetermined time 423 and determine whether to release the connection with the mmWave network. When the terminals 401 and 413 determine to release the connection with the mmWave network and to connect with the LTE network, a time 425 is required for connecting from the physical layer to the application layer in the LTE network and fitting the optimal communication environment.

A performance deterioration occurs during a handover due to, e.g., lack of data transmission for the time 423 required to determine whether to release the connection with the mmWave network and a reduction in data throughput (slow start) for the time 425 required for connection to the LTE network.

Figure 5A:
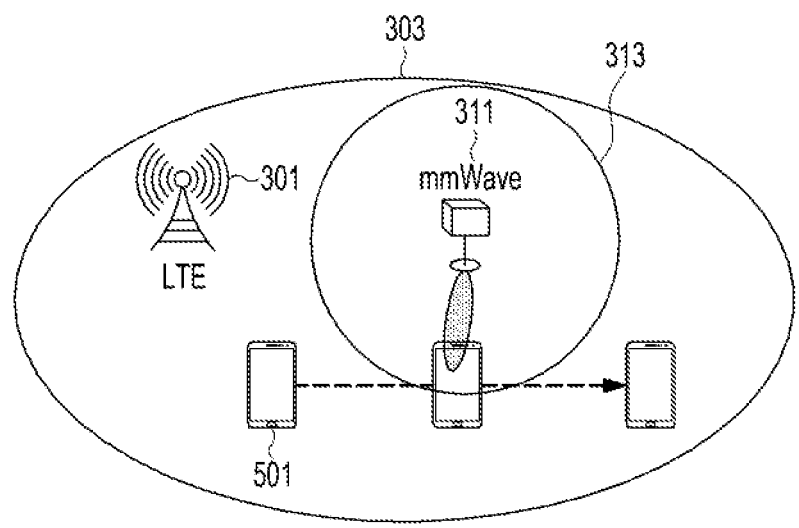
FIGS. 5A and 5B are views illustrating an example in which a handover occurs from an LTE network to a mmWave network and then a handover back to the LTE network occurs according to an embodiment of the present disclosure.
Figure 5B:
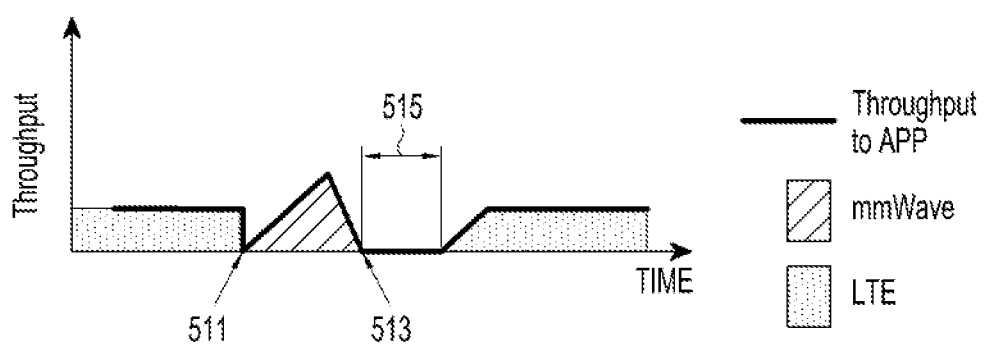

FIGS. 5A and 5B are views illustrating an example in which a handover occurs an LTE network to a mmWave network and then a handover back to the LTE network occurs according to an embodiment of the present disclosure.

FIG. 5A illustrates an example in which two handovers occur as the terminal is on the move.

Referring to FIG. 5A, the terminal 501, which is present in the service coverage area 303 of the LTE base station 301 and connects with the LTE network, moves and enters the service coverage area 313 of the mmWave base station 311. Then, the terminal 501 departs from the service coverage area 313 of the mmWave base station 311 back to the service coverage area 303 of the LTE base station 301. Specifically, when the terminal 501 enters the service coverage area 313 of the mmWave base station 311, the terminal 501 performs a first handover to the mmWave network because the mmWave network is higher in priority than the LTE network. Thereafter, as the terminal 501 moves back to the coverage 303 served only by the LTE base station 301, a second handover to the LTE network occurs.

FIG. 5B illustrates data throughput in a network connected with the terminal 501 according to variations in time and the amount of data transmissions (simply referred to as throughputs) according thereto.

The terminal 501 connected with the LTE network communicates at the data throughput supported by the LTE network. The terminal 501 connected with the LTE network moves and connects to the mmWave network (511). At this time, since the connection should be made from the physical layer of the mmWave network, the data throughput of the terminal 501 gradually increases from, e.g., 0. However, as the terminal 501 moves back (513) to the service coverage 303 of the LTE base station 301 before the connection with the mmWave network is subjected to the optimal environment, the connection with the mmWave network is deteriorated, causing a reduction in the data throughput. Thereafter, the terminal 501, upon disconnection from the mmWave network, determines whether to release the connection with the mmWave network for a predetermined time 515. For the predetermined time 515, the terminal 501 does not connect with any network and thus cannot communicate data. As such, due to the frequent handover, the terminal 501 may present a reduced overall performance as compared with when it is connected with only the LTE network.

Figure 6A:
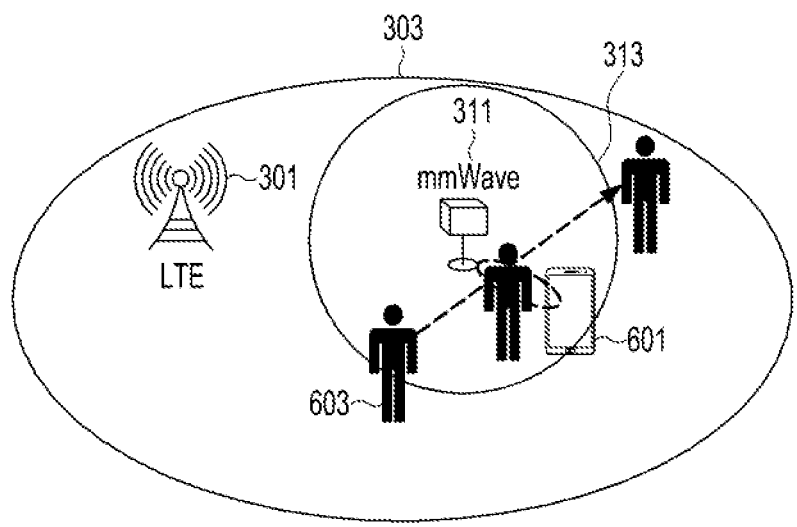
FIGS. 6A and 6B are views illustrating an example in which a handover occurs from a mmWave network to an LTE network and a handover back to the mmWave network occurs according to an embodiment of the present disclosure.
Figure 6B:
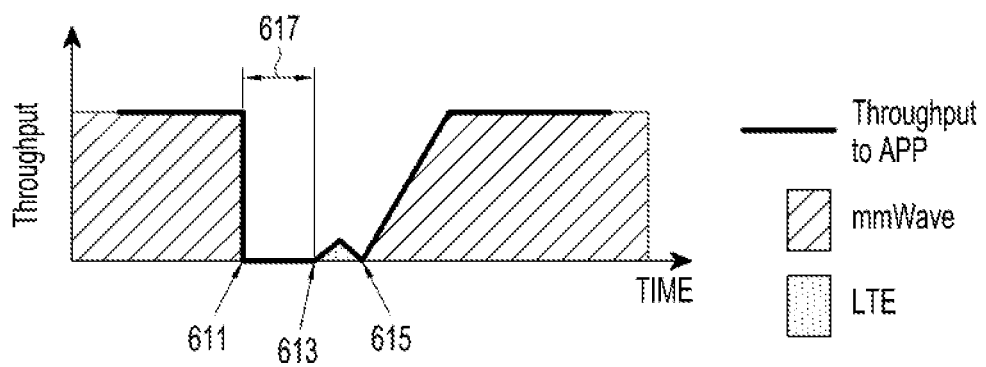

FIGS. 6A and 6B are views illustrating an example in which a handover occurs from a mmWave network to an LTE network and a handover back to the mmWave network occurs according to an embodiment of the present disclosure.

FIG. 6A illustrates an example in which two handovers are caused by an obstacle.

Referring to FIG. 6A, the terminal 601 is present in the coverage 313 servable by the LTE base station 301 and mmWave base station 311 and receives services from the mmWave base station 311 with a higher priority. However, the terminal 601 may temporarily fail to receive service from the mmWave base station 311 due to a movement of the obstacle, e.g., a human being 603. The terminal 601, unaware whether the failure of connection with the mmWave network is temporary, discovers other base stations. Since the area where the terminal 601 is present may be served by the LTE base station 301, the terminal 601 performs a first handover to the LTE base station 301. Thereafter, upon discovery of the mmWave base station 311, the terminal 601 performs a second handover to the mmWave base station 311.

FIG. 6B illustrates data throughput in a network connected with the terminal 601 according to variations in time and the amount of data transmissions (simply referred to as throughputs) according thereto.

The terminal 601 connected with the mmWave network communicates at the data throughput supported by the mmWave network. The terminal 601 connected to the mmWave network is disconnected from the mmWave network by the movement of the obstacle, e.g., human being 603 (611). The terminal 601, upon disconnection from the mmWave network (611), determines whether to release the connection with the mmWave network higher in priority for a predetermined time 617. For the predetermined time 617, the terminal 601 does not connect with any network and is thus unable to communicate data. When the terminal 601 determines to release the connection with the mmWave network, a handover to the LTE network occurs (613). At this time, since the connection should be made from the physical layer of the LTE network, the data throughput of the terminal 601 gradually increases from, e.g., 0. Thereafter, when the human being 603 moves so that the terminal 601 happens to discover the mmWave base station 311, a handover back to the mmWave network occurs (615). It may be shown also from the example of FIGS. 6A and 6B that a handover caused by an obstacle may deteriorate the performance of the terminal.

Now described is a handover method capable of preventing a performance deterioration despite frequent handover and apparatus supporting the same.

Figure 7:
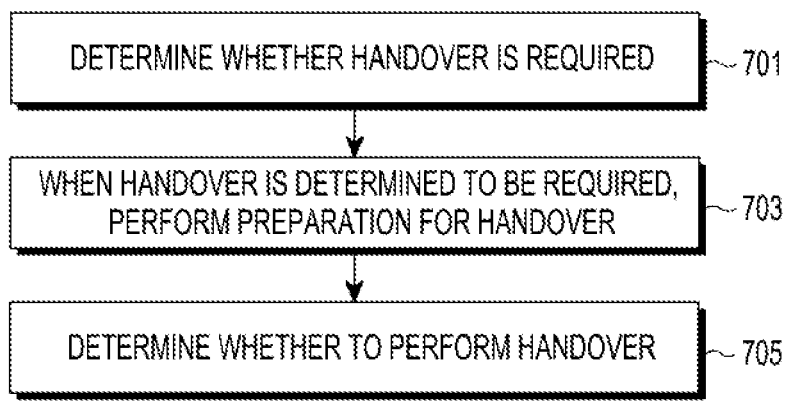
FIG. 7 is a flowchart illustrating a handover performed by a terminal according to an embodiment of the present disclosure.

FIG. 7 is a flowchart illustrating a handover performed by a terminal according to an embodiment of the present disclosure.

Referring to FIG. 7, the terminal determines whether it is under a circumstance requiring a handover at operation 701. For example, when the terminal connects with a new network or releases or is predicted to release the connection with the existing network, the terminal may measure the signal quality with the existing network to determine whether the handover is required. For example, a movement of the terminal itself or movement of an obstacle or variation in the network environment may be such circumstance as requires handover.

The terminal performs a handover ready operation at operation 703. The terminal, when subjected to the circumstance requiring handover, connects to the new network as well as the existing network and communicates data. Further, the terminal, under the handover-required circumstance, should monitor variations in several factors related to handover during the delay period. In other words, the terminal determines whether a handover is actually required by grasping the variations in the factors during the delay period rather than immediately performing handover. Simultaneously, the terminal may prepare to immediately hand over to the new network while maintaining the application session continuity with the existing network during the delay period. Further, the terminal may enable quick recovery when connecting back to the existing network by storing parameters related to the existing network during the delay period. The several factors monitored may include those related to the terminal, such as temperature and battery usage of the terminal, as well as those related to the network, such as information regarding signal strength such as received signal strength indicator (RSSI), bandwidth (BW), packet error rate (PER), and their trends.

The terminal determines whether to perform the handover at operation 705. The determination as to whether to perform the handover may consider at least one of a lapse of a predetermined period, downloading or uploading of a predetermined amount of data, or when the quality (RSSI, PER, or BW) of the higher-priority network becomes sufficiently good or bad.

Thereafter, the terminal may perform the handover according to the determination.

Figure 8:
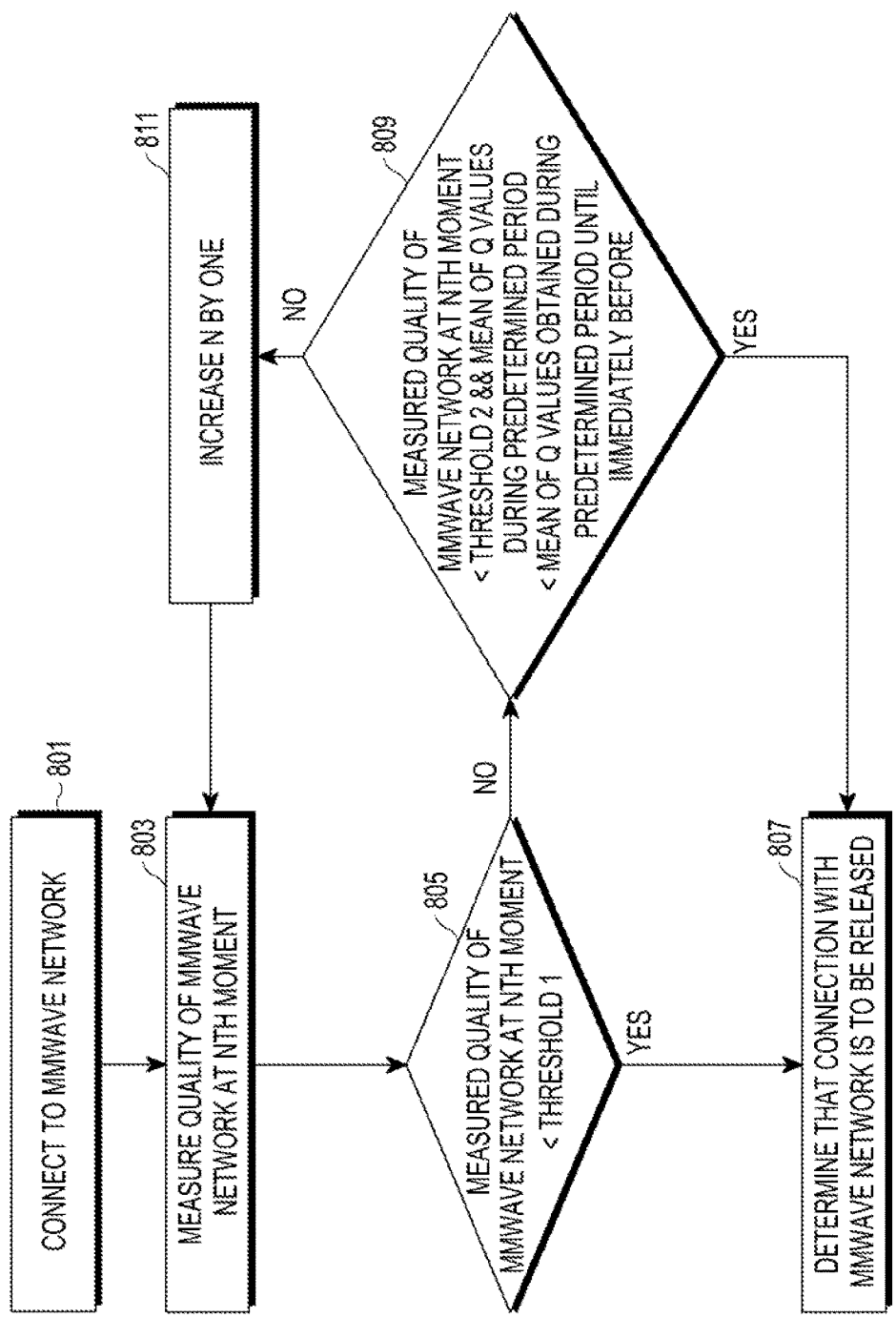
FIG. 8 is a view illustrating a process for predicting the release of a connection with a network by a terminal according to an embodiment of the present disclosure.

FIG. 8 is a view illustrating a process for predicting the release of a connection with a network by a terminal according to an embodiment of the present disclosure.

The process for predicting the release of the connection with the network may be performed by measuring the quality of the network in operations 703 to 705 of FIG. 7. Although an example of measuring the quality of the mmWave network is described below, the quality of other networks may also be measured depending on circumstances.

Referring to FIG. 8, the terminal is connected with the mmWave network in operation 801.

In operation 803, the terminal measures the quality of the mmWave network at predetermined time intervals and converts into a Qn value (for the nth measurement) and stores the same. Q may be a function having signal strength, BW, and PER indicating the quality of a network as parameters. The predetermined time may be in second(s) (sec) or millisecond(s) (msec).

In operation 805, the terminal determines whether the Qn value is smaller than a predetermined first threshold (threshold 1). The first threshold may be a reference value for determining that the connection between the mmWave network and the terminal is not good and thus needs to be released or has already been released.

In operation 807, the terminal may predict the release of the connection with the mmWave network when the Qn value is smaller than the first threshold.

Further, in operation 809, although the Qn value is larger than the first threshold, the terminal determines that the current connection with the mmWave network is deteriorated as compared with the prior state. In other words, when the Qn value is smaller than a predetermined second threshold (threshold 2), and a mean value for Q values thus far, AVG (Qm, . . . , Qn), for a predetermined period, is smaller than a mean value for Q values immediately therebefore, AVG (Qm, . . . , Qn−1), the terminal may determine that the connection with the mmWave network is deteriorated (where, m<n). When the Qn value is smaller than the second threshold, and the mean value for the Q values gradually decreases, the terminal may determine that the connection with the mmWave network is to be released in operation 807.

Here, the second threshold is larger than the first threshold. Further, although the mean value is described as an example, other values, such as an arithmetic mean or geometric mean, may also be available, and the predetermined period may be properly adjusted depending on ambient environments by one of ordinary skill in the art.

When the Qn value is larger than the second threshold, or the mean value for the Q values gradually increases, the terminal may regard the connection with the mmWave network as good. Subsequently, in operation 811, the terminal increases n by one in order for next network quality measurement.

Figure 9:
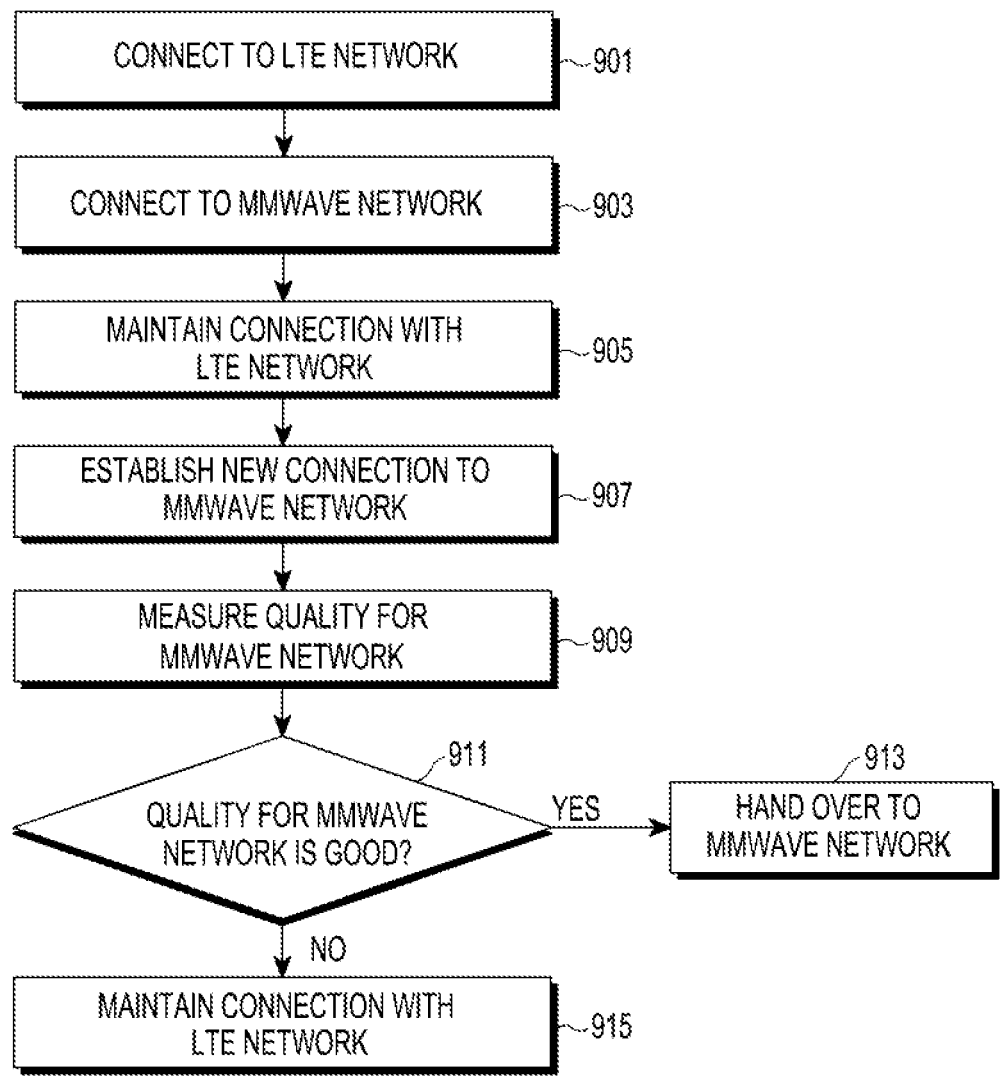
FIG. 9 is a view illustrating a process for performing a handover when a terminal connected with an LTE network searches for a mmWave base station according to an embodiment of the present disclosure.

FIG. 9 is a view illustrating a process for performing a handover when a terminal connected with an LTE network searches for a mmWave base station according to an embodiment of the present disclosure.

Referring to FIG. 9, the terminal is connected to the LTE network (connection 1) to receive services in operation 901.

The terminal, although connected with the LTE network, may search for other base stations. In operation 903, the terminal searches for the mmWave base station and connects to the mmWave network.

In operation 905, the terminal, although connected with the mmWave network, maintains the connection with the LTE network.

In operation 907, the terminal establishes a new connection (connection 2) to the mmWave network. The terminal may download and upload data through both the networks because the terminal establishes the connection to the mmWave network while maintaining the connection with the LTE network.

In operation 909, the terminal measures the quality for the mmWave network while in connection with both the networks.

The period during which operations 905 to 909 are performed may be denoted a 'period for determining whether to perform a handover.' The 'period for determining whether to perform a handover' may be herein referred to as an 'elastic handover period' or 'delay period.'

In operation 911, the terminal determines whether the quality for the mmWave network is good. In other words, the terminal may measure the quality for the mmWave network in the same method as that described above in connection with FIG. 8.

When the measured quality for the mmWave network is good, the terminal performs a handover to the mmWave network in operation 913.

When the measured quality for the mmWave network is bad or determined to be bad, the terminal maintains the connection with the LTE network without performing a handover in operation 915.

Thus, according to the method of FIG. 9, since the terminal determines whether to perform a handover to the mmWave network while connected with the LTE network to communicate data, the application session continuity may be maintained.

Figure 10B:
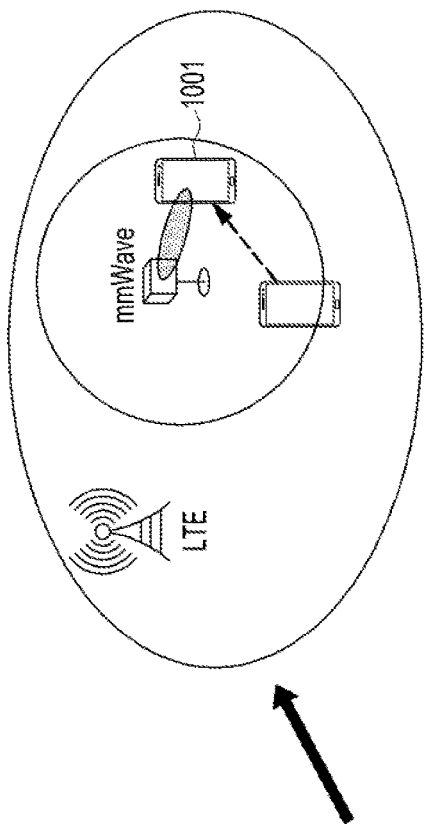
FIGS. 10A to 10C are views illustrating an example in which a terminal connected with an LTE network performs a handover to a mmWave base station according to an embodiment of the present disclosure.
Figure 10C:
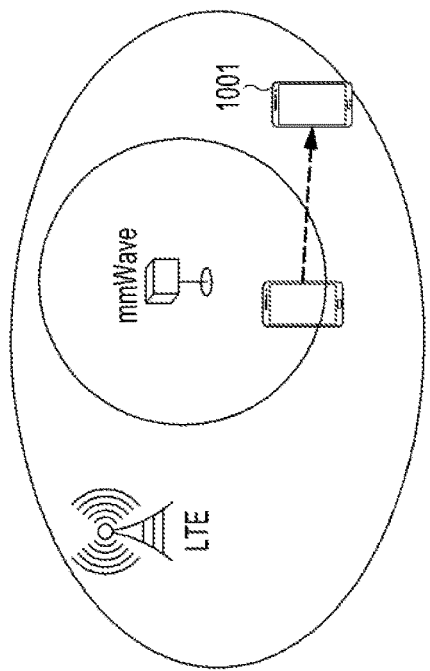
Figure 10A:
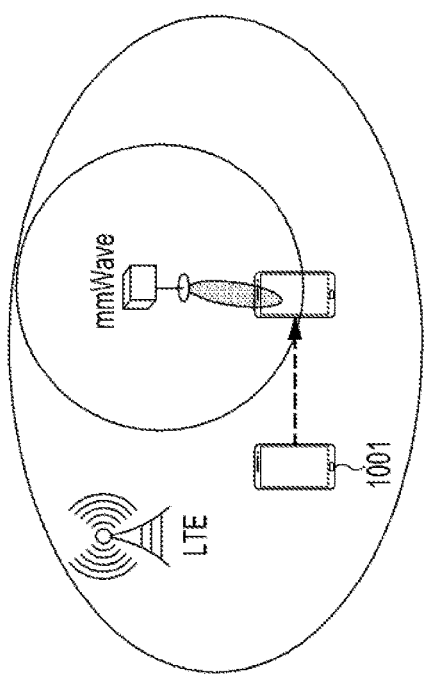

FIGS. 10A to 10C are views illustrating an example in which a terminal connected with an LTE network performs a handover to a mmWave base station according to an embodiment of the present disclosure.

FIG. 10A illustrates operation 903 of FIG. 9. Referring to FIG. 10A, the terminal 1001 connected with the LTE network to receive services moves to receive services from the mmWave network.

The terminal 1001 may stably receive services from the mmWave network as illustrated in FIG. 10B or may fail to receive services from the mmWave network as illustrated in FIG. 10C depending on moving routes.

Figure 11A:
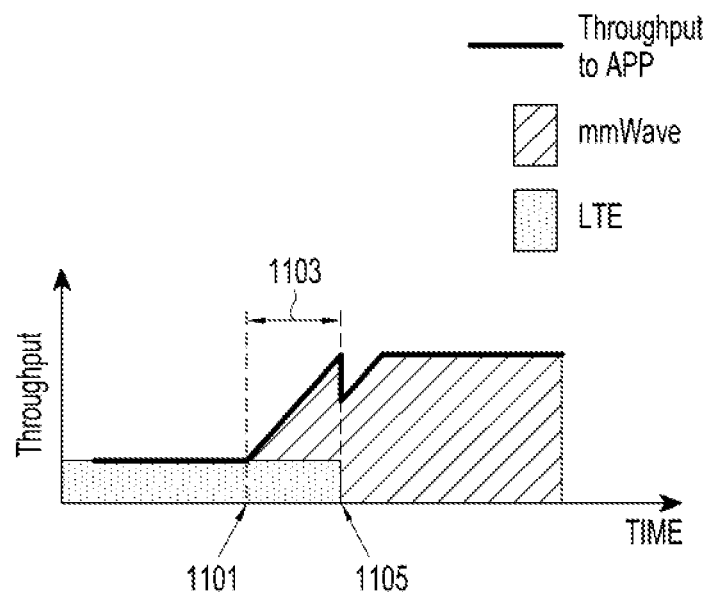
FIGS. 11A and 11B are views illustrating an amount of data transmissions of a terminal connected with an LTE network to perform a handover to a mmWave base station according to an embodiment of the present disclosure.
Figure 11B:
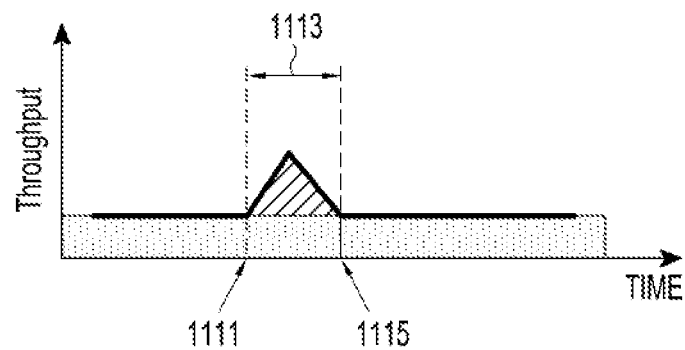

FIGS. 11A and 11B are views illustrating an amount of data transmissions of a terminal connected with an LTE network to perform a handover to a mmWave base station according to an embodiment of the present disclosure.

FIG. 11A illustrates data throughput when the terminal 1001 moves as shown in FIG. 10B.

Referring to FIG. 11A, although the terminal 1001 connected with the LTE network to receive services moves to connect with the mmWave network (1101), the terminal 1001 may be connected with both the mmWave network and the LTE network to upload and download data during a predetermined period 1103 (i.e., the period for determining whether to perform a handover, delay period, or elastic handover period, such as from operation 905 to operation 909). Thus, in the instant embodiment, the data throughput of the terminal 1001 becomes a combination of the data throughput of the mmWave network and the data throughput of the LTE network even when the mmWave network is connected, thereby enhancing the performance as compared with the method of the related art.

In operation 911, when the terminal 1001 determines that the quality of the mmWave network is good (1105), the terminal 1001 performs a handover to the mmWave network.

FIG. 11B illustrates data throughput when the terminal 1001 moves as shown in FIG. 10C.

Referring to FIG. 11B, although the terminal 1001 connected with the LTE network to receive services moves to connect with the mmWave network (1111), the terminal 1001 may be connected with both the mmWave network and the LTE network to upload and download data during a predetermined period 1113, i.e., during the period where operations 905 to 909 are performed (the period for determining whether to perform a handover). Thus, as described above in connection with FIG. 11A, the data throughput of the terminal 1001 becomes a combination of the data throughput of the mmWave network and the data throughput of the LTE network even when the mmWave network is connected, thereby enhancing the performance as compared with the method of the related art. Further, although the connection with the mmWave network is released, the performance may be enhanced as compared with the method of the related art because the terminal 1001 performs data communication using the LTE network.

In operation 911, when the terminal 1001 determines that the quality of the mmWave network is not good (1115), the terminal 1001 maintains the connection with the LTE network without performing a handover to the mmWave network.

In other words, the terminal may increase the data throughput by establishing the period for determining whether to perform a handover to maintain connection with all the networks and communicating data.

Figure 12:
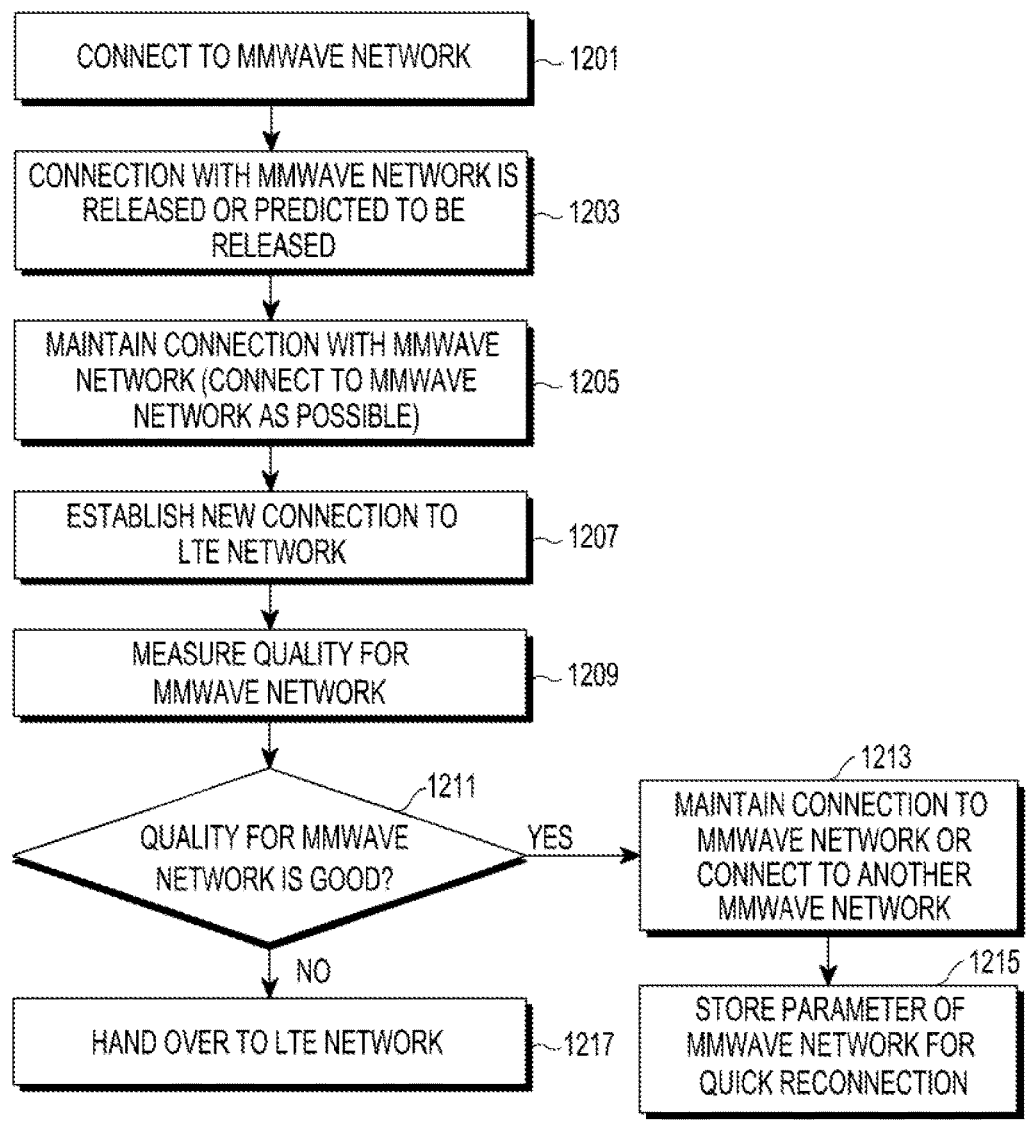
FIG. 12 is a view illustrating a process for performing a handover when a terminal connected with a mmWave network releases the connection or is determined to release the connection according to an embodiment of the present disclosure.

FIG. 12 is a view illustrating a process for performing a handover when a terminal connected with a mmWave network releases the connection or is determined to release the connection according to an embodiment of the present disclosure.

Referring to FIG. 12, the terminal is connected to the mmWave network (connection 1) to receive services in operation 1201.

In operation 1203, the terminal determines that the connection with the mmWave network is released or to be released and connects with the LTE network. In operation 1205, the terminal maintains the connection with the mmWave network without releasing, and as possible, connects to the mmWave network.

In operation 1207, the terminal may upload and download data to/from the connected LTE network.

In operation 1209, the terminal measures the quality for the mmWave network.

As described above in connection with FIG. 9, the period during which operations 1205 to 1209 are performed may be regarded as the 'period for determining whether to perform a handover' or 'delay period.'

In operation 1211, the terminal determines whether the quality for the mmWave network is good. In other words, the terminal may determine that the connection is to be released by measuring the quality for the mmWave network as described above in connection with FIG. 8.

When the measured quality for the mmWave network is bad or determined to be bad, the terminal performs a handover to the LTE network in operation 1217.

However, when the measured quality for the mmWave network is good, the terminal maintains the connection with the multi user multiple-input multiple-output (MU-MIMO) in operation 1213. Further, the terminal may discover a mmWave network other than the above-described mmWave network and connect with the other mmWave network. In operation 1215, when the terminal connects with the other mmWave network, the terminal may store parameters of the other mmWave network for a future quick reconnection.

Also in the instant embodiment, since the terminal determines whether to perform a handover to the LTE network while connected with the mmWave network to communicate data, the application session continuity may be maintained.

When the terminal determines that the connection with the mmWave network is to be released and when the connection is abruptly released are distinctively described below with reference to FIGS. 13A, 13B, 13C, 14A, 14B, 15A, 15B, 15C, 16A, and 16B.

Figure 13B:
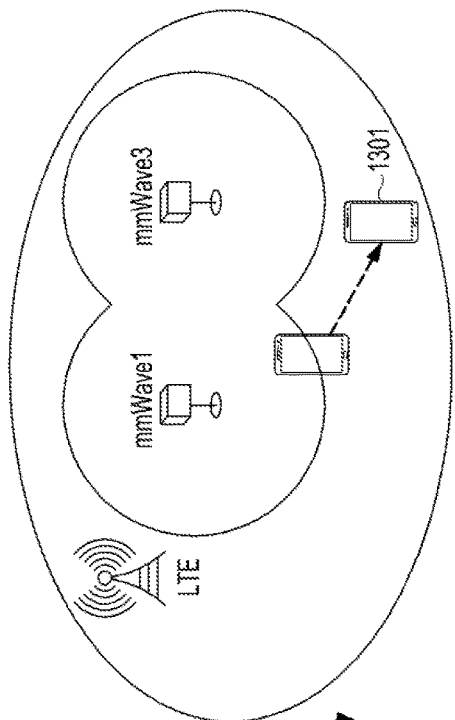
FIGS. 13A to 13C are views illustrating a circumstance where a terminal is determined to release a connection with a mmWave network according to an embodiment of the present disclosure.
Figure 13C:
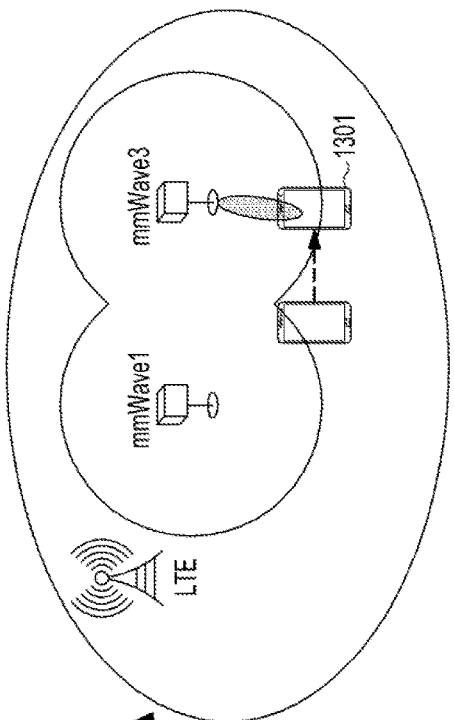
Figure 13A:
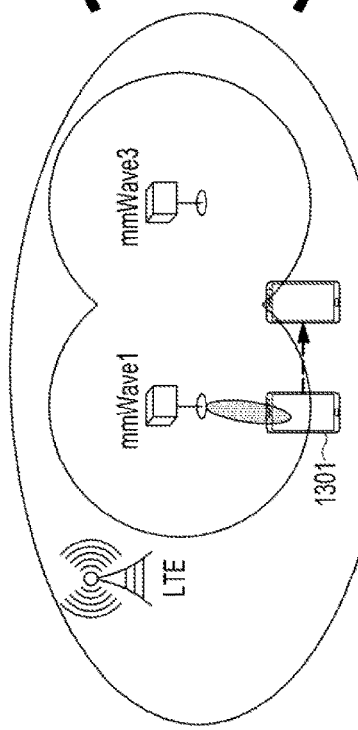

FIGS. 13A to 13C are views illustrating a circumstance where a terminal is determined to release a connection with a mmWave network according to an embodiment of the present disclosure.

FIG. 13A illustrates operation 1203 of FIG. 12. In other words, the terminal 1301 connected with the mmWave network to receive services may move and thus determine that the connection with the mmWave network is to be released.

The terminal 1301 may fail to receive services from the mmWave network and thus receive services from the LTE network as illustrated in FIG. 13B or may receive services from another mmWave network as illustrated in FIG. 13C depending on moving routes.

Figure 14A:
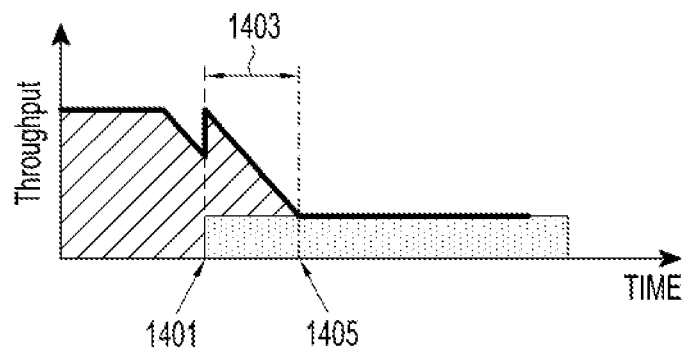
FIGS. 14A and 14B are views illustrating an amount of data transmissions of a terminal under the circumstance where the terminal is determined to release a connection with a mmWave network according to an embodiment of the present disclosure.
Figure 14B:
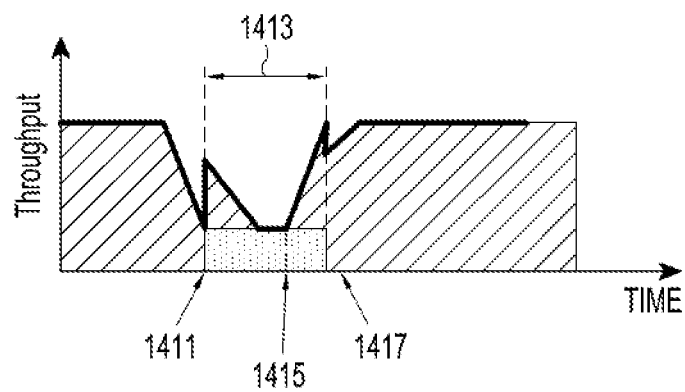

FIGS. 14A and 14B are views illustrating an amount of data transmissions of a terminal under the circumstance where the terminal is determined to release a connection with a mmWave network according to an embodiment of the present disclosure.

FIG. 14A illustrates data throughput when the terminal 1301 moves as shown in FIG. 13B.

As the terminal 1301 connected with the mmWave network to receive services may move, the data throughput with the mmWave network may reduce, and the terminal 1301 may thus determine that the connection with the mmWave network is to be released. Further, the terminal 1301 may preliminary connect with the LTE network even while the terminal 1301 is connected with the mmWave network (1401). In this case, the terminal 1301 may immediately communicate with the LTE network at the highest data throughput.

During a predetermined period 1403, i.e., while operations 1205 to 1209 are performed (period for determining whether to perform a handover or delay period), the terminal 1301 may be connected with both the LTE network and the mmWave network to upload and download data. Thus, in the instant embodiment, the data throughput of the terminal 1301 becomes a combination of the data throughput of the mmWave network and the data throughput of the LTE network even when the connection with the mmWave network is determined to be released, thereby enhancing the performance as compared with the method of the related art.

In operation 1211, when the terminal 1301 determines that the quality of the mmWave network is not good and the connection thereto is to be released (1405), the terminal 1001 performs a handover to the LTE network.

FIG. 14B illustrates data throughput when the terminal 1301 moves as shown in FIG. 13C.

As the terminal 1301 connected with the mmWave network to receive services may move, the data throughput with the mmWave network may reduce, and the terminal 1301 may thus determine that the connection with the mmWave network is to be released. Further, the terminal 1301 may preliminary connect with the LTE network even while the terminal 1301 is connected with the mmWave network (1411). In this case, the terminal 1301 may immediately communicate with the LTE network at the highest data throughput.

During the delay period 1413, i.e., while operations 1205 to 1209 are performed (period for determining whether to perform a handover), the terminal 1301 may be connected with both the LTE network and the mmWave network to upload and download data. Thus, in the instant embodiment, the data throughput of the terminal 1301 becomes a combination of the data throughput of the mmWave network and the data throughput of the LTE network, thereby enhancing the performance as compared with the method of the related art.

During the delay period 1413, the terminal 1301 may connect with the mmWave network or a new mmWave network (1415).

In operation 1211, when the terminal 1301 determines that the quality of the new mmWave network is good (1417), the terminal 1301 may perform a handover to the new mmWave network. Or, in operation 1211, when the terminal 1301 determines that the quality of the mmWave network is good (1417), the terminal 1301 may maintain the connection with the mmWave network.

Figure 15B:
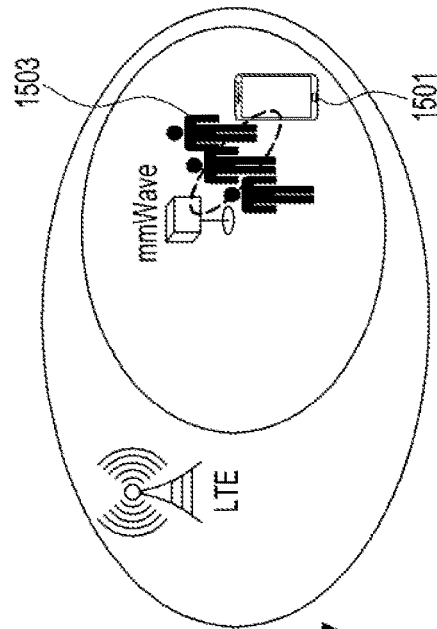
FIGS. 15A to 15C are views illustrating a circumstance where a terminal abruptly releases a connection with a mmWave network according to an embodiment of the present disclosure.
Figure 15C:
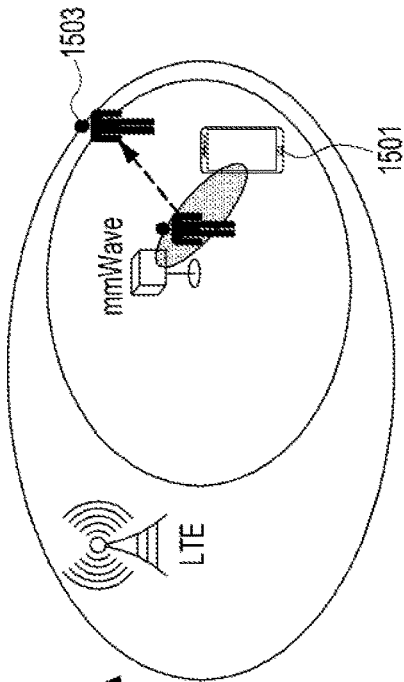
Figure 15A:
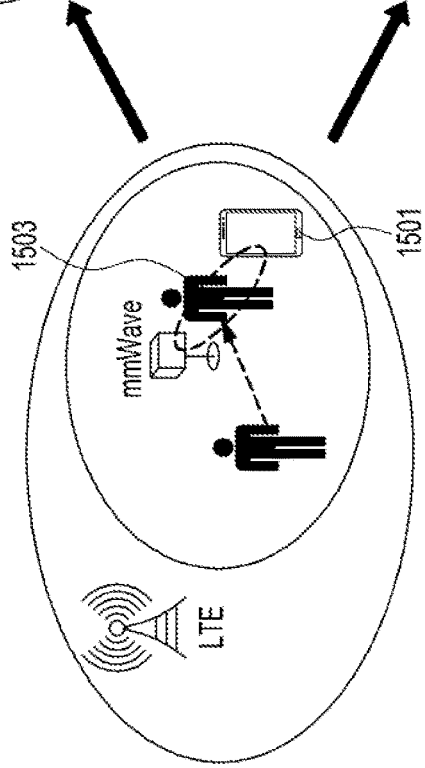

FIGS. 15A to 15C are views illustrating a circumstance where a terminal abruptly releases a connection with a mmWave network according to an embodiment of the present disclosure.

FIG. 15A illustrates operation 1203 of FIG. 12. In other words, the terminal 1501 connected with the mmWave network to receive services may abruptly release the connection with the mmWave network due to an obstacle 1503.

The terminal 1501 may remain unrecovered for the connection with the mmWave network by the obstacle 1503 as illustrated in FIG. 15B. Or, as the obstacle 1503 is removed, the terminal 1501 may recover the connection with the mmWave network as illustrated in FIG. 15C.

Figure 16A:
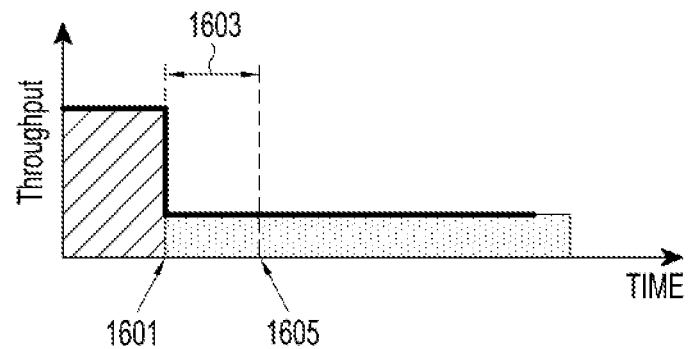
FIGS. 16A and 16B is a view illustrating an amount of data transmissions of a terminal under the circumstance where the terminal abruptly releases a connection with a mmWave network according to an embodiment of the present disclosure.
Figure 16B:
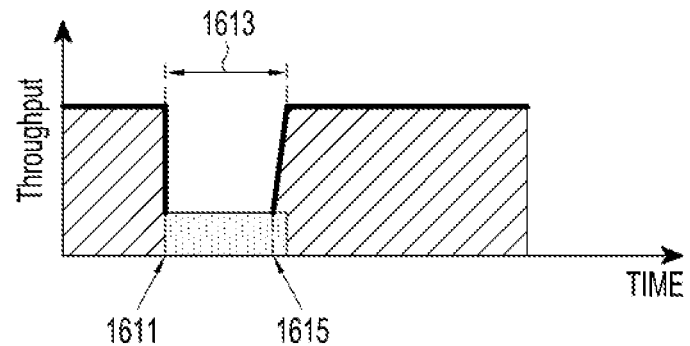

FIGS. 16A and 16B are views illustrating the amount of data transmissions of a terminal under the circumstance where the terminal abruptly releases a connection with a mmWave network according to an embodiment of the present disclosure.

FIG. 16A illustrates data throughput when the terminal 1501 continues to be interrupted by the obstacle as shown in FIG. 15B.

Referring to FIG. 16A, the terminal 1501, when failing to send data through the mmWave network, may determine that the connection with the mmWave network is abruptly released. The terminal 1501 connected with the mmWave network to receive services, upon abrupt release of the connection with the mmWave network, recovers the connection with the previous LTE network to which the terminal 1501 used to connect (1601). Due to the connection with the previous LTE network, the terminal 1501 may communicate with the LTE network at the highest data throughput.

During the delay period 1603, i.e., while operations 1205 to 1209 are performed (period for determining whether to perform a handover), the terminal 1501 determines whether the connection with the mmWave network may be recovered.

However, the terminal 1501 may download or upload data only through the connection with the LTE network because of the release of the connection with the mmWave network during the delay period 1603.

When the terminal 1501 determines that the connection with the mmWave network is unrecoverable (1605), the terminal 1501 performs a handover to the LTE network in operation 1211.

FIG. 16B illustrates data throughput when the terminal 1501 is temporarily interrupted by the obstacle as shown in FIG. 15C.

Referring to FIG. 16B, the terminal 1501, when failing to send data through the mmWave network, may determine that the connection with the mmWave network is abruptly released. The terminal 1501 connected with the mmWave network to receive services, upon abrupt release of the connection with the mmWave network, recovers the connection with the previous LTE network to which the terminal 1501 used to connect (1611). Due to the connection with the previous LTE network, the terminal 1501 may communicate with the LTE network at the highest data throughput.

During the delay period 1613, i.e., while operations 1205 to 1209 are performed (period for determining whether to perform a handover), the terminal 1501 determines whether the connection with the mmWave network may be recovered.

Likewise, the terminal 1501 may download or upload data only through the connection with the LTE network because of the release of the connection with the mmWave network during the delay period 1613.

During the delay period 1613, the terminal 1501 may connect with the mmWave network (1615). The terminal 1501 saves parameters of the mmWave network and is able to quickly recover the connection. In operation 1211, when the terminal 1501 determines that the quality of the mmWave network is good, the terminal 1501 maintains the connection with the mmWave network.

Figure 17:
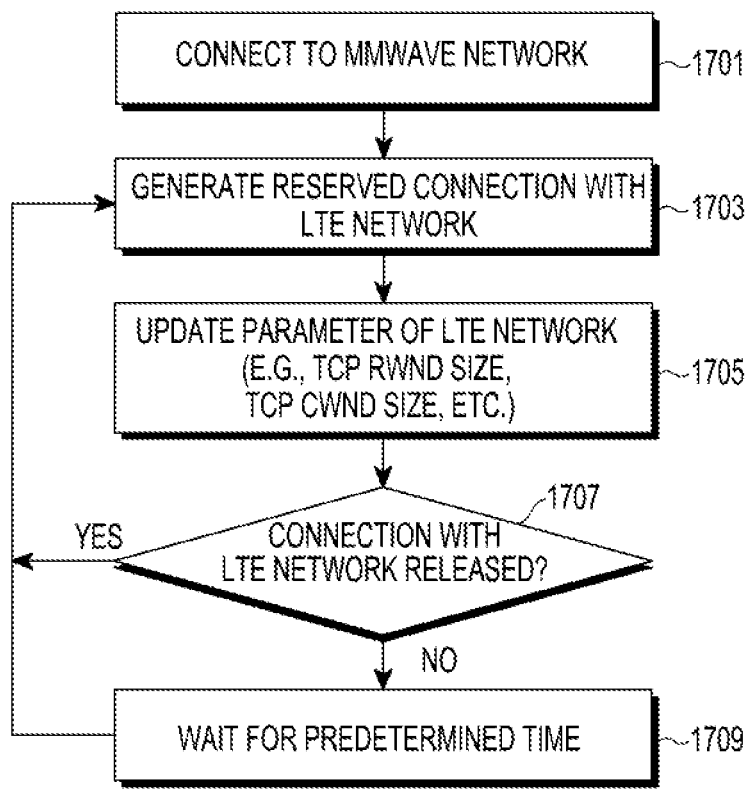
FIG. 17 is a flowchart illustrating a method for performing a quick connection to an LTE network for application session continuity when a terminal abruptly releases a connection with a mmWave network according to an embodiment of the present disclosure.
Figure 18:
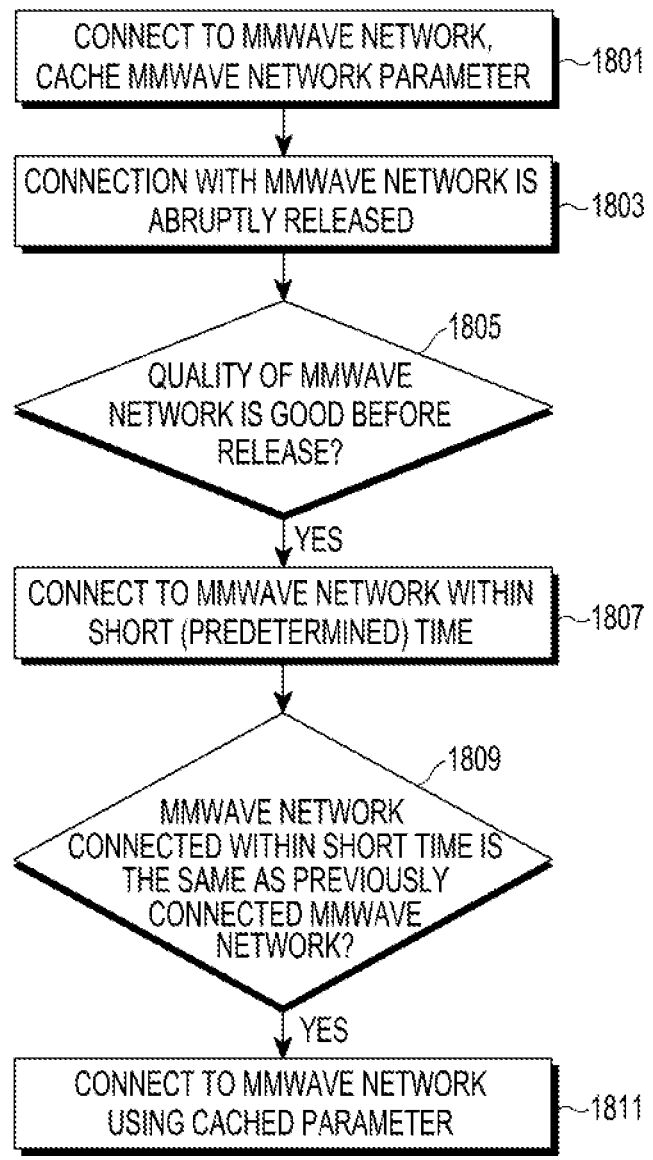
FIG. 18 is a flowchart illustrating a method for a terminal to perform a quick connection to a mmWave network for application session continuity according to an embodiment of the present disclosure.

FIGS. 17 and 18 illustrate a method by which a terminal performs a quicker connection to a network for application session continuity (hereinafter, referred to as 'fast recovery') according to an embodiment of the present disclosure.

FIG. 17 is a flowchart illustrating a method for performing a quick connection to an LTE network for application session continuity when a terminal abruptly releases a connection with a mmWave network according to an embodiment of the present disclosure.

Referring to FIG. 17, the terminal is connected with the mmWave network to receive services in operation 1701.

In operation 1703, the terminal generates a reserved connection with the LTE network.

In operation 1705, the terminal updates parameters of the LTE network for higher data processing capability. For example, the parameters may include transfer control protocol receiving window (TCP RWND) size or transfer control protocol congestion window (TCP CWND) size.

In operation 1707, the terminal identifies whether the connection with the LTE network is released. When the connection is released, the terminal reperforms operation 1703. However, unless the connection is released, the terminal waits for a predetermined time in operation 1709. Thereafter, the terminal reperforms operation 1703.

In other words, according to the fast recovery method, the terminal maintains the reserved connection with the LTE network even when connected with the mmWave network and able to receive services. Thereafter, although the terminal abruptly releases the connection with the mmWave network, the terminal may perform rapid communication through the reserved connection with the LTE network.

FIG. 18 is a flowchart illustrating a method for a terminal to perform a quick connection to a mmWave network for application session continuity according to an embodiment of the present disclosure.

The instant embodiment may apply when the terminal connected with the mmWave network is temporarily network-interrupted by a moving obstacle and is then recovered.

Referring to FIG. 18, the terminal is connected with the mmWave network to receive services in operation 1801. The terminal caches parameters related to the mmWave network. The cached parameters may include TCP RWND size, TCP CWND size, or slow start threshold. Further, the parameters may include a value when the terminal transmits data at the highest data throughput using the mmWave network.

In operation 1803, the connection between the terminal and the mmWave network is abruptly released.

In operation 1805, the terminal determines whether the quality of the mmWave network is good before the abrupt release.

In operation 1807, the terminal connects to the mmWave network within a short time. Or, the terminal connects to the mmWave network within a predetermined time (threshold).

In operation 1809, the terminal determines whether the mmWave network to which the terminal connects within the short time is the same as the mmWave network to which the terminal used to connect before the abrupt release.

In operation 1811, the terminal connects to the mmWave network using the cached parameters.

A reference for determining whether the mmWave network is of good quality or a reference for the short time may be previously determined or dynamically varied depending on contexts.

In other words, when the mmWave network remains the same as the existing one upon the terminal's reconnection to the mmWave network, the above method enables quick reconnection, i.e., recovery, using pre-stored parameters related to the mmWave network.

Figure 19A:
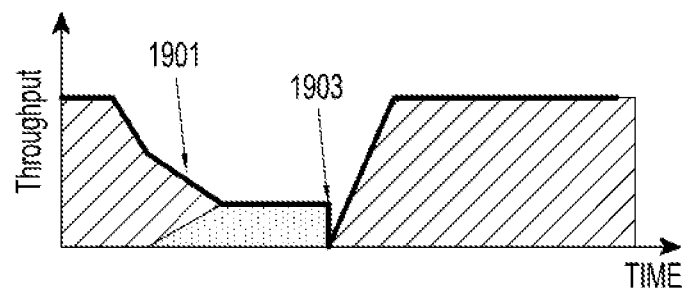
FIGS. 19A to 19C are views illustrating a comparison of amounts of data transmissions of a terminal under a circumstance where the terminal is predicted to release a connection with an existing network and connects with another network according to an embodiment of the present disclosure.
Figure 19B:
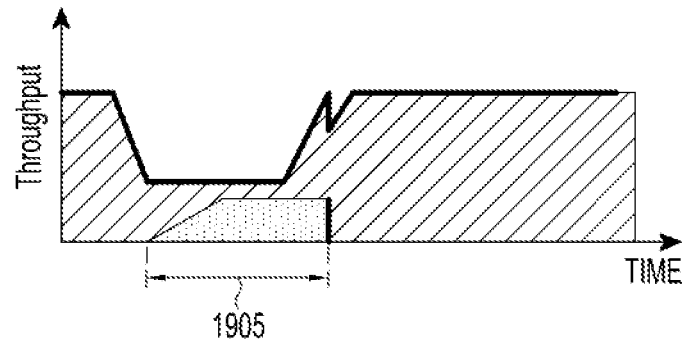
Figure 19C:
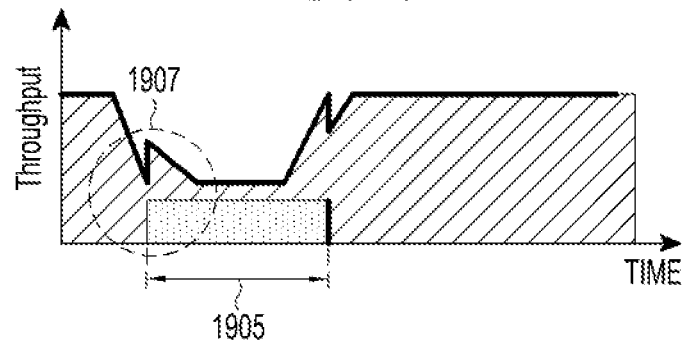

FIGS. 19A to 19C are views illustrating a comparison of amounts of data transmissions of a terminal under the circumstance where the terminal is predicted to release a connection with an existing network and connects with another network according to an embodiment of the present disclosure.

FIG. 19A illustrates the data throughput of the terminal when the terminal performs a handover under the circumstance shown in FIG. 13C (where the connection with the existing network is predicted to be released and a connection with another network is made).

Referring to FIG. 19A, when the terminal connected with a mmWave1 network is predicted to release the connection with the mmWave1 network, the terminal performs a handover to the LTE network (1901). Thereafter, upon connecting with a mmWave3 network, the terminal releases the connection with the LTE network and performs a handover to the connected mmWave3 network (1903).

Until before performing the handover (1901) to the LTE network, the terminal may transmit data at a data transmission speed supported by the mmWave1 network. Thereafter, while performing the handover (1901) to the LTE network, the terminal may transmit data through the mmWave1 network and the LTE network, and after the handover to the LTE network, the terminal may transmit data at a data transmission speed supported by the LTE network.

Then, the terminal, upon discovery of the mmWave3 network, disconnects from the LTE network and performs a handover (1903) to the mmWave3 network. After performing the handover (1903) to the mmWave3 network, the terminal may transmit data at a data transmission speed supported by the mmWave3 network.

FIG. 19B illustrates the data throughput of the terminal when the terminal performs a handover using a period for determining whether to perform a handover under the circumstance shown in FIG. 13C.

Referring to FIG. 19B, although the connection between the terminal and the mmWave1 network is predicted to be released, the terminal is connected with both the mmWave1 network and the LTE network to transmit data during the delay period 1905. Since the terminal remains disconnected from the LTE network while in connection with the mmWave1 network, a time is required for the data throughput with the LTE network to become optimal.

Thereafter, even when the terminal connects to the mmWave3 network, the terminal transmits data via connection with both the mmWave3 network and the LTE network within the delay time 1905 (period for determining whether to perform a handover or elastic handover period).

FIG. 19C illustrates the data throughput of the terminal when the terminal performs connection to another network more quickly (fast recovery) as well as uses the period for determining whether to perform a handover under the circumstance shown in FIG. 13C.

Referring to FIG. 19C, even when the terminal remains stably connected with the mmWave1 network, the terminal connects to the LTE network. Thereafter, when the connection with the mmWave1 network is predicted to be released, the terminal may immediately transmit data via the LTE network because the terminal is also connected with the LTE network (1907). In other words, unlike in FIG. 19B, the fast recovery does not require a time for the data throughput between the terminal and the LTE network to be optimized.

Resultantly, the terminal may steadily maintain the connection with the other network, and when the connection with its connecting network is predicted to be released, the terminal may send data most efficiently using the period for determining whether to perform a handover.

Figure 20A:
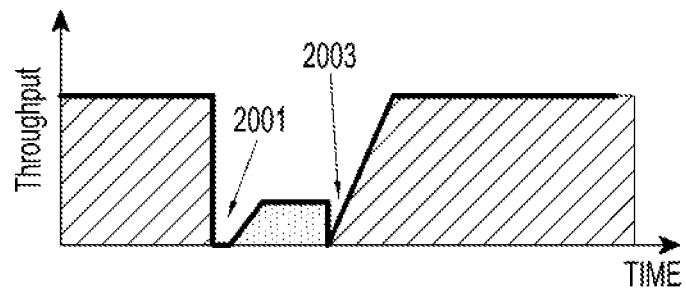
FIGS. 20A to 20C are views illustrating a comparison of amounts of data transmissions of a terminal under a circumstance where the terminal abruptly releases a connection with an existing network and recovers the connection according to an embodiment of the present disclosure.
Figure 20B:
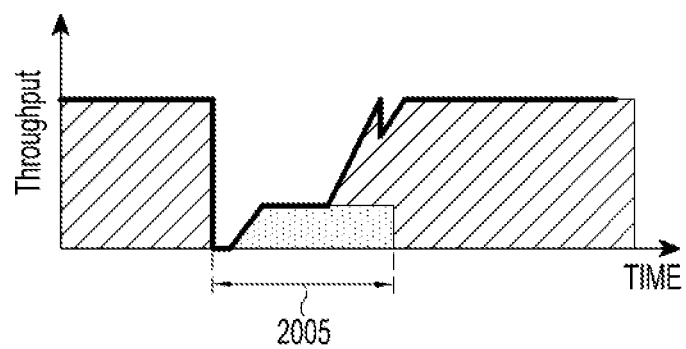
Figure 20C:
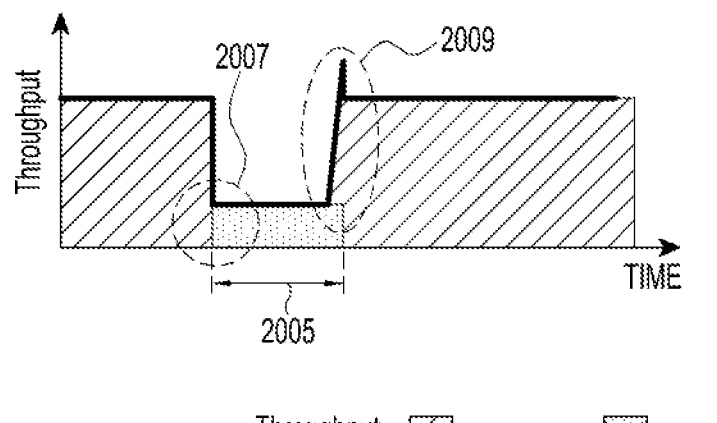

FIGS. 20A to 20C are views illustrating a comparison of amounts of data transmissions of a terminal under the circumstance where the terminal abruptly releases a connection with an existing network and recovers the connection according to an embodiment of the present disclosure.

FIG. 20A illustrates the data throughput of the terminal when the terminal performs a handover scheme of the related art under the circumstance shown in FIG. 15B (where the connection with an existing network is abruptly released and is then recovered).

Referring to FIG. 20A, when the connection between the mmWave network and the terminal is released and the connection with the mmWave network is not recovered within a predetermined time, the terminal performs a first handover to the LTE network (2001). Thereafter, when connecting back to the mmWave network, the terminal releases the connection with the LTE network and performs a second handover (2003) to the mmWave network.

Until before performing the handover (2001) to the LTE network, the terminal may transmit data at a data transmission speed supported by the mmWave1 network. Then, when the connection between the terminal and the mmWave network is released, the terminal is in no connection with any network and thus cannot send data. After the terminal connects to the LTE network and performs a handover (2001) to the LTE network, a time is required for the data throughput with the LTE network to become optimal because the connection with the LTE network had been released.

Then, the terminal, upon discovery of the mmWave network, disconnects from the LTE network and performs a handover (2003) to the mmWave network. After the terminal connects to the mmWave network and performs a handover (2003) to the mmWave network, the terminal may send data at a data transmission speed supported by the mmWave network. Likewise, since the connection with the mmWave network had been released, a time is required for the data throughput with the mmWave network to be optimal. Further, since the terminal does not store parameters related to the mmWave network, a connection with the mmWave network is not made rapidly. That is, fast recovery is impossible.

FIG. 20B illustrates the data throughput of the terminal when the terminal performs a handover using a period for determining whether to perform a handover under the circumstance shown in FIG. 15B.

Referring to FIG. 20B, the terminal determines whether to release the connection with the mmWave network during the delay period 2005 even when the connection with the mmWave network is abruptly released. Further, the terminal attempts to connect to the LTE network and sends data. However, since the terminal remains disconnected from the LTE network while in connection with the mmWave network, a time is required for the data throughput with the LTE network to become optimal.

Thereafter, even when the terminal connects to the mmWave network, the terminal transmits data via connection with both the mmWave network and the LTE network within the delay time 2005 (period for determining whether to perform a handover).

After the terminal performs a handover to the mmWave network, the terminal may send data using the mmWave network.

FIG. 20C illustrates the data throughput of the terminal when the terminal performs reconnection to the existing network more quickly (fast recovery) as well as uses the period for determining whether to perform a handover under the circumstance shown in FIG. 15B.

Referring to FIG. 20*c*, even when the terminal remains stably connected with the mmWave network, the terminal connects to the LTE network. Thereafter, when the connection between the terminal and the mmWave network is released, the terminal may send data at the optimal data throughput using the LTE network by the fast recovery because the terminal is also connected with the LTE network (2007).

Further, the terminal stores parameters of the mmWave network under the circumstance where the terminal is in optimal connection with the mmWave network. Next, when the terminal reconnects to the mmWave network, the terminal may swiftly recover the connection using the parameters (fast recovery). This is why the terminal uses the parameters and thus need not discover the optimal communication environment with the mmWave network. Therefore, the data throughput of the terminal is increased as compared with that by other methods (2009).

As in FIGS. 19A to 19C, the terminal may send data in a most efficient manner when there are fast recovery and period for determining whether to perform a handover.

Figure 21:
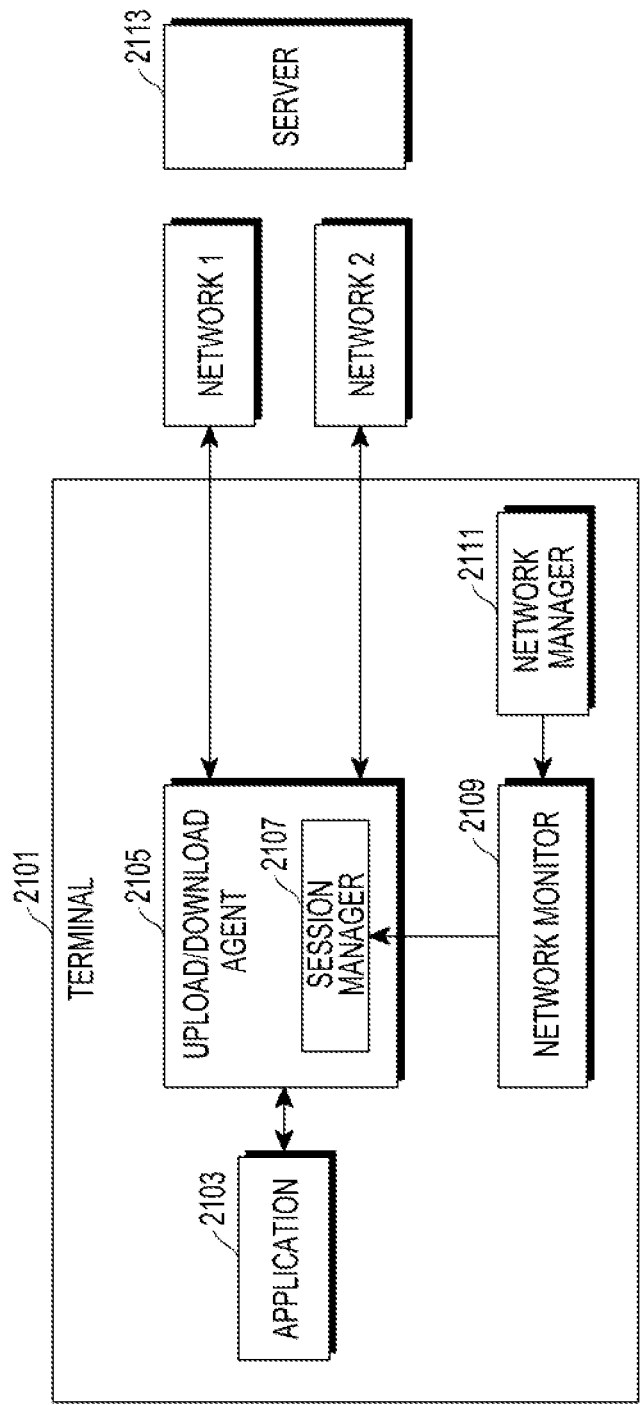
FIG. 21 is a view illustrating an internal configuration of a terminal according to an embodiment of the present disclosure.

FIG. 21 is a view illustrating an internal configuration of a terminal according to an embodiment of the present disclosure.

Referring to FIG. 21, the terminal 2101 may include an application 2103, an upload/download agent 2105, a network monitor 2109, and a network manager 2111.

The application 2103 may support the user to upload/download data to/from a server 2113 using the terminal 2101.

The upload/download agent 2105 may include a session manager 2107 for supporting embodiments of the present disclosure and may further include a hypertext transfer protocol (HTTP) stack or local proxy. The upload/download agent 2105 manages all other sessions requiring file upload/download, HQ video request, and high processing capability. Operations described herein may be performed primarily by the session manager 2107.

The network monitor 2109 monitors such network characteristics as TCP, RSSI, PER, channel impulse peak (CIR), such as replicated acknowledgement (ACK) number, network connection or release event, retransmission rate, receiving window size, or congestion window size, using the network manager 2111. The monitored event is sent to the session manager 2107 to assist the session manager 2107 in determining whether to perform a handover.

Although each component is distinctively described herein, each component may also be performed by a controller (i.e. a processor). Furthermore, although not illustrated in FIG. 21, a terminal according to various embodiments of the present disclosure may include components as known in the art to support wireless communication. Such components may include a transceiver, a memory, a touchscreen, one or more antennas, etc.

Figure 22:
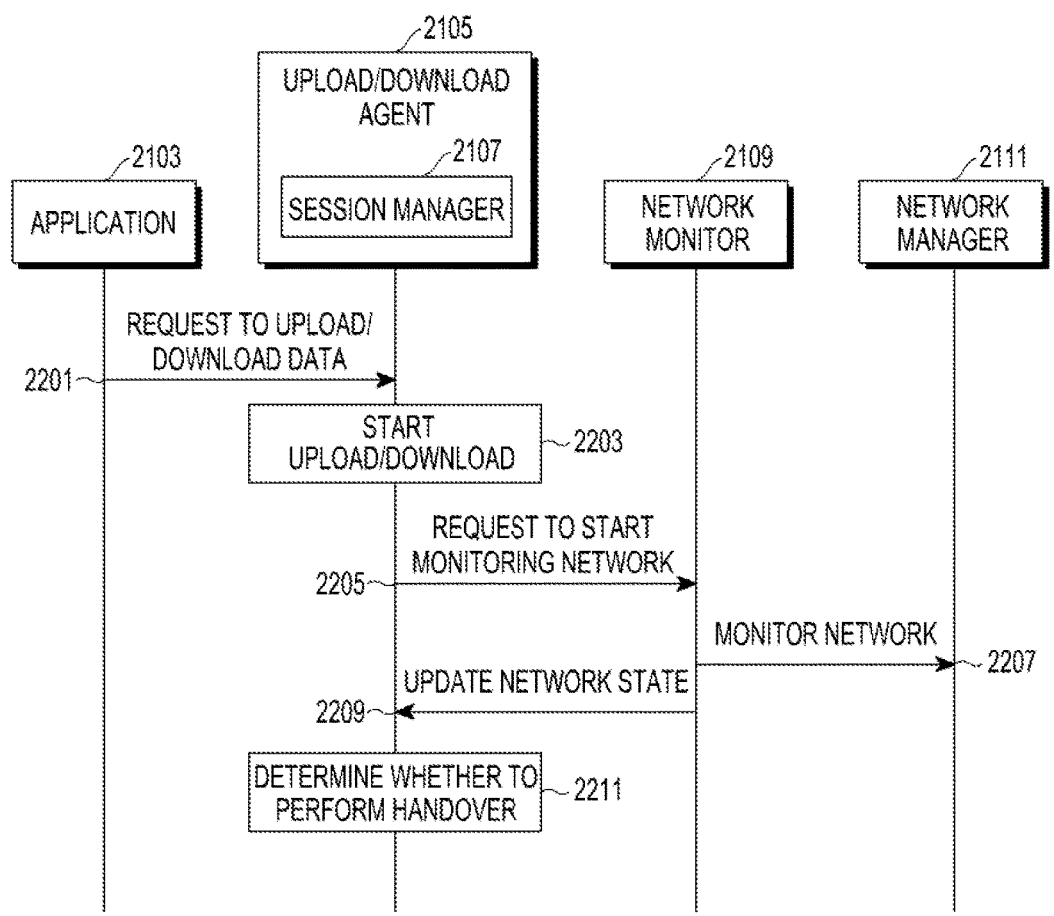
FIG. 22 is a flowchart illustrating operations of internal components of a terminal according to an embodiment of the present disclosure.

FIG. 22 is a flowchart illustrating operations of internal components of a terminal according to an embodiment of the present disclosure.

Referring to FIG. 22, the application 2103 sends a request for uploading/downloading data to the upload/download agent 2105 in operation 2201.

In operation 2203, upon receiving the uploading/downloading request, the upload/download agent 2105 starts an upload/download session using the session manager 2107.

In operation 2205, when the upload/download session starts, the upload/download agent 2105 sends a request for starting to monitor the network to the network monitor 2109.

In operation 2207, the network monitor 2109 monitors the network using the network manager 2111.

In operation 2209, the network monitor 2109, upon detecting a variation in the network, notifies the upload/download agent 2105. Selectively, the network monitor 2109 may send the notification to the session manager 2107. In other words, the network monitor 2109 updates the network's state.

In operation 2211, the upload/download agent 2105 or the session manager 2107 may determine whether to perform a handover and run a handover based on the variation in the network.

Figure 23:
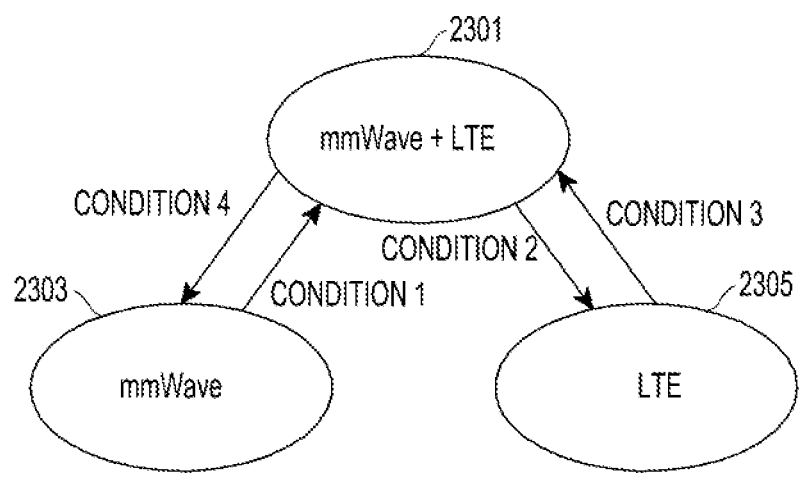
FIG. 23 is a state diagram illustrating a network used when a terminal receives data according to an embodiment of the present disclosure.

FIG. 23 is a state diagram illustrating a network used when a terminal receives data according to an embodiment of the present disclosure.

Referring to FIG. 203, when a network connected is not of good quality, the terminal monitors the quality of the network and determines whether to perform a handover during a predetermined period (period for determining whether to perform a handover). The terminal downloads data via both the mmWave network and LTE network during the predetermined time (2301).

Table 1 represents conditions for occurrence of a handover when the terminal downloads data.

The terminal, upon meeting condition 2 in Table 1, downloads data using only the LTE network (2305). Then, upon meeting condition 3 in Table 1, the terminal downloads data via both the mmWave network and LTE network (2301).

Selectively, the terminal, upon meeting condition 4 in Table 1, downloads data using only the mmWave network (2303). Then, upon meeting condition 1 in Table 1, the terminal downloads data via both the mmWave network and LTE network (2301).

TABLE 1

Conditions where handover may occur upon download

| | | |
|---|---|---|
| Condition 1 | Connection with network with higher priority is predicted to be released | RSSI < RSSI_Threshold_HIGH − RSSI_Margin_HIGH \|\| PER > PER_Threshold_LOW + PER_Margin_LOW\|\| BW1 < BW_Threshold − BW_Margin\|\| Device is turned around and turned Angle > Threshold |
| Condition 2 | Connection with network with higher priority is temporarily released | RSSI < RSSI_Threshold_LOW − RSSI_Margin_LOW keeps MIN_TIME \|\| PER < PER_Threshold_HIGH − PER_Margin_HIGH keeps MIN_TIME \|\| (Remaining Battery < BAT_Threshold && Not Charging) \|\| Device Temperature > TEMP_Threshold |
| Condition 3 | Connected to network with higher priority | RSSI > RSSI_Threshold_LOW + RSSI_Margin_LOW && PER < PER_Threshold_HIGH − PER_Margin_HIGH && (Remaining Battery > BAT_Threshold \|\| Is Charging) && Device Temperature < TEMP_Threshold |
| Condition 4 | Connnected with higher-priority network, and network quality is good | RSSI > RSSI_Threshold_HIGH + RSSI_Margin_HIGH keeps MIN_TIME && PER < PER_Threshold_LOW − PER_Margin_LOW keeps MIN_TIME && BW_2/BW1 > α(α is a constant defined for the energy efficiency ratio, e.g., Energy per Byte of Network2/Energy per Byte of Network 1) |

In Table 1, the threshold and margin may be constants and may be dynamically varied depending on network or environments. Further, BW_1 denotes the bandwidth of LTE network, and BW_2 denotes the bandwidth of the mmWave network.

FIGS. 24A to 24E are views illustrating whether a terminal connected with an LTE network performs a handover and a network used for downloading data according to an embodiment of the present disclosure.

Figure 24A:
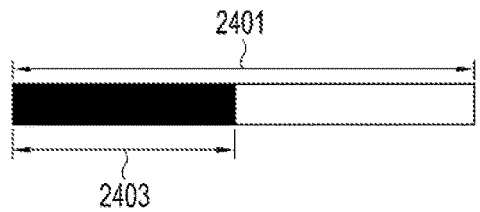
FIGS. 24A to 24E are views illustrating whether a terminal connected with an LTE network performs a handover and a network used for downloading data according to an embodiment of the present disclosure.

FIG. 24A illustrates data to be downloaded by the terminal connected with the LTE network. In principle, since the terminal is connected with the LTE network, the overall data 2401 may be downloaded via the LTE network. After some data 2403 of the overall data 2401 has already been downloaded through the LTE network, the terminal may connect to the mmWave network when meeting condition 3 in Table 1. Here, the terminal switches from state 2305 of FIG. 23 to state 2301.

Figure 24B:
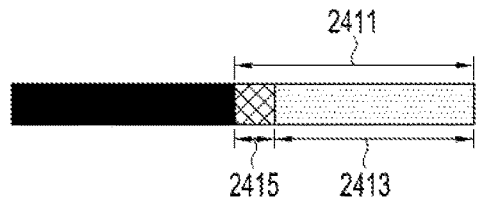

FIG. 24B illustrates a network to which the terminal may connect when the terminal downloads the remainder 2411 of the overall data. The terminal may connect to the mmWave network while remaining connected with the LTE network. Thus, some 2415 of the remaining data is downloaded through the LTE network while the terminal is connected to the mmWave network. In other words, the terminal may detect whether a stable connection to the mmWave network is possible or the bandwidth of the mmWave network while connecting to the mmWave network. This period may be a period during which some 2415 of the remaining data is computed by "predetermined amount of data*bandwidth of the mmWave network." Thereafter, the data 2413 to be downloaded may be downloaded via a connection with the LTE network or mmWave network depending on subsequent circumstances.

Figure 24C:
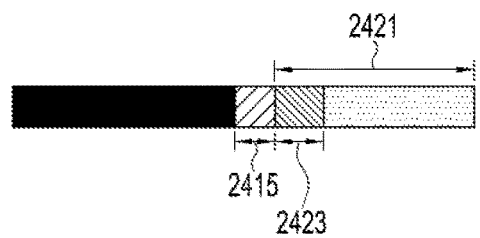

FIG. 24C illustrates which network the terminal staying in state 2301 is to use for downloading the remaining data when the terminal meets condition 4. Since the mmWave network is of good quality, the terminal may download the remaining data 2421 through the mmWave network. Data 2423 of the remaining data 2421 denotes data already downloaded through the mmWave network.

Figure 24D:
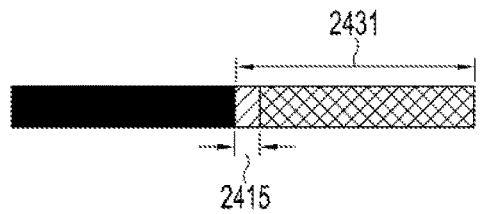

FIG. 24D illustrates which network the terminal staying in state 2301 is to use for downloading the remaining data when the terminal meets condition 2. In other words, since the connection between the terminal and the mmWave network is resultantly released, the terminal downloads the remaining data 2431 via the LTE network. In this case, all the data 2401 is downloaded via the LTE network.

Figure 24E:
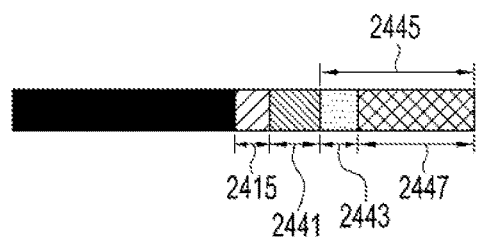

Referring to FIG. 24E, the terminal staying in state 2301 still fails to meet condition 2 or 4 and thus additionally determines whether to perform a handover. In other words, although the connection with the mmWave network is made, the connection is not in a stabilized state. Thus, the terminal may download some 2441 of the data through the mmWave network. As a result, the terminal is in connection with the mmWave network, and as the connection with the mmWave network becomes unstable, the terminal turns the same state as the terminal that is in the state 2301. That is, the terminal is in the state as shown in FIG. 25B. Data 2443, 2445, and 2447 respectively correspond to 2515, 2511, and 2513 of FIG. 25B.

FIGS. 25A to 25E are views illustrating whether a terminal connected with a mmWave network performs a handover and a network used for downloading data according to an embodiment of the present disclosure.

Figure 25A:
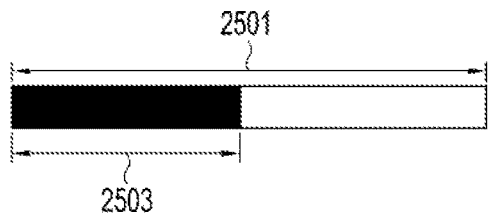
FIGS. 25A to 25E are views illustrating whether a terminal connected with a mmWave network performs a handover and a network used for downloading data according to an embodiment of the present disclosure.
Figure 25B:
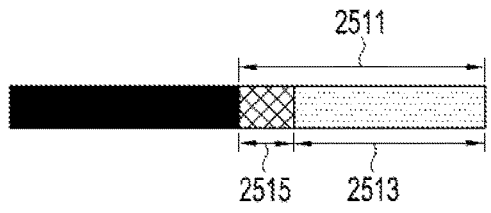

FIG. 25A illustrates data to be downloaded by the terminal connected with the mmWave network. In principle, since the terminal is connected with the mmWave network, the overall data 2501 may be downloaded via the mmWave network. After some data 2503 of the overall data 2501 has already been downloaded through the mmWave network, the terminal may go under condition 1 of Table 1, i.e., the connection with the mmWave network may be predicted to be released. Here, the terminal is in the state 2301 of FIG. 23.

FIG. 25B illustrates a network to which the terminal in the state 2301 may connect when the terminal downloads the remainder 2511 of the overall data. The terminal, upon determining that the connection with the mmWave network is not released, may connect to the LTE network while maintaining the connection with the mmWave network. Thus, some 2515 of the remaining data is downloaded via the mmWave network while the terminal monitors the state of connection with the mmWave network. In other words, the terminal may detect whether a stable connection to the mmWave network is possible or the bandwidth of the mmWave network while monitoring the state of connection with the mmWave network. This period may be a period during which some 2515 of the remaining data is computed by "predetermined amount of data*bandwidth of the mmWave network." Thereafter, the data 2513 to be downloaded may be downloaded via a connection with the LTE network or mmWave network depending on subsequent circumstances.

Figure 25C:
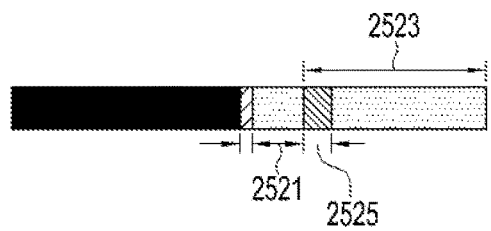

FIG. 25C illustrates which network the terminal staying in state 2301 is to use for downloading the remaining data when the terminal meets condition 2. When the connection with the mmWave network is released before fully downloading some 2515 of the remaining data, the terminal connects to the LTE network to download the remaining data 2521 and 2523. Some data 2525 of the remaining data 2523 denotes data already downloaded through the LTE network.

Figure 25D:
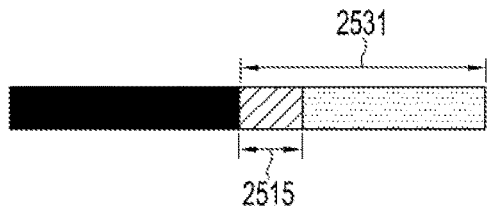

FIG. 25D illustrates which network the terminal staying in state 2301 is to use for downloading the remaining data when the terminal meets condition 4. Since the mmWave network is determined to be of good quality, the terminal may download the remaining data 2531 through the mmWave network. In this case, all the data 2501 ends up being downloaded via the mmWave network.

Figure 25E:
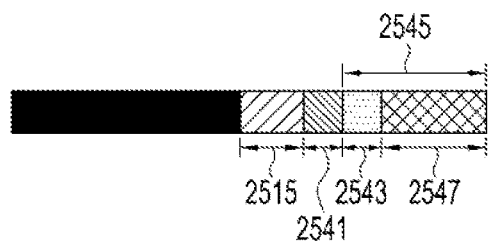

Referring to FIG. 25E, the terminal staying in state 2301 still fails to meet condition 2 or 4 and thus additionally determines whether to perform a handover. That is, the connection with the mmWave network is still in the unstable state. Thus, the terminal may download some 2541 of the data through the LTE network. As a result, the terminal is in connection with the LTE network, and as the terminal newly connects to the mmWave network, the terminal turns the same state as the terminal that is in the state 2301. That is, the terminal is in the state as shown in FIG. 24B. Data 2543, 2545, and 2547 respectively correspond to 2415, 2411, and 2413 of FIG. 24B.

Figure 26:
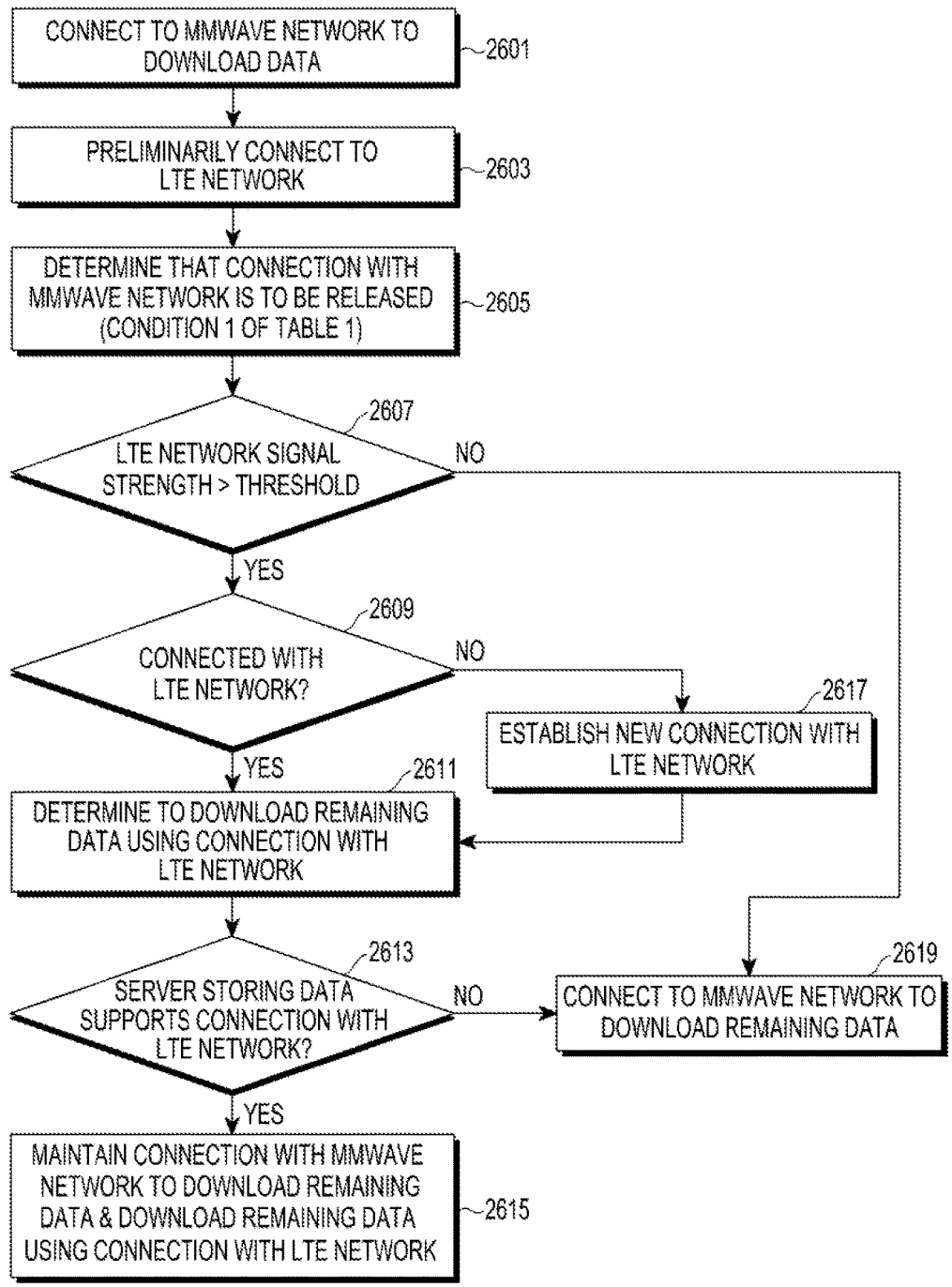
FIG. 26 is a flowchart illustrating operations performed by a terminal when a mmWave network is not in a good state while the terminal is connected with the mmWave network to download data according to an embodiment of the present disclosure.

FIG. 26 is a flowchart illustrating operations performed by a terminal when a connection with a mmWave network is not in a good state while the terminal is connected with the mmWave network to download data according to an embodiment of the present disclosure.

Referring to FIG. 26, the terminal connects to the mmWave network to download data in operation 2601.

In operation 2603, the terminal preliminarily connects to the LTE network. This state may be referred to as an idle connection to the LTE network.

In operation 2605, the terminal may predict that the connection with the mmWave network is to be released (condition 1 of Table 1).

In operation 2607, the terminal measures the strength of LTE network signals and determines whether the measured strength is larger than a predetermined threshold.

When the measured strength of LTE network signals is smaller than the threshold, the terminal remains connected to the mmWave network to download the remaining data in operation 2619.

However, when the measured strength of LTE network signals is larger than the threshold, the terminal determines whether the terminal is connected with the LTE network in operation 2609.

Unless the terminal is connected with the LTE network, the terminal establishes a new connection with the LTE network in operation 2617 and performs operation 2611.

However, when the terminal is connected with the LTE network, the terminal performs operation 2611.

In operation 2611, the terminal determines to download the remaining data using the connection with the LTE network.

In operation 2613, the terminal identifies whether a server storing the data supports connection with the LTE network.

When the server supports the connection with the LTE network, the terminal maintains the connection with the mmWave network to download the remaining data in operation 2615. The terminal simultaneously starts to download the remaining data using the connection with the LTE network.

However, when the server does not support connection with the LTE network, the terminal remains connected to the mmWave network to download the remaining data in operation 2619.

Figure 27:
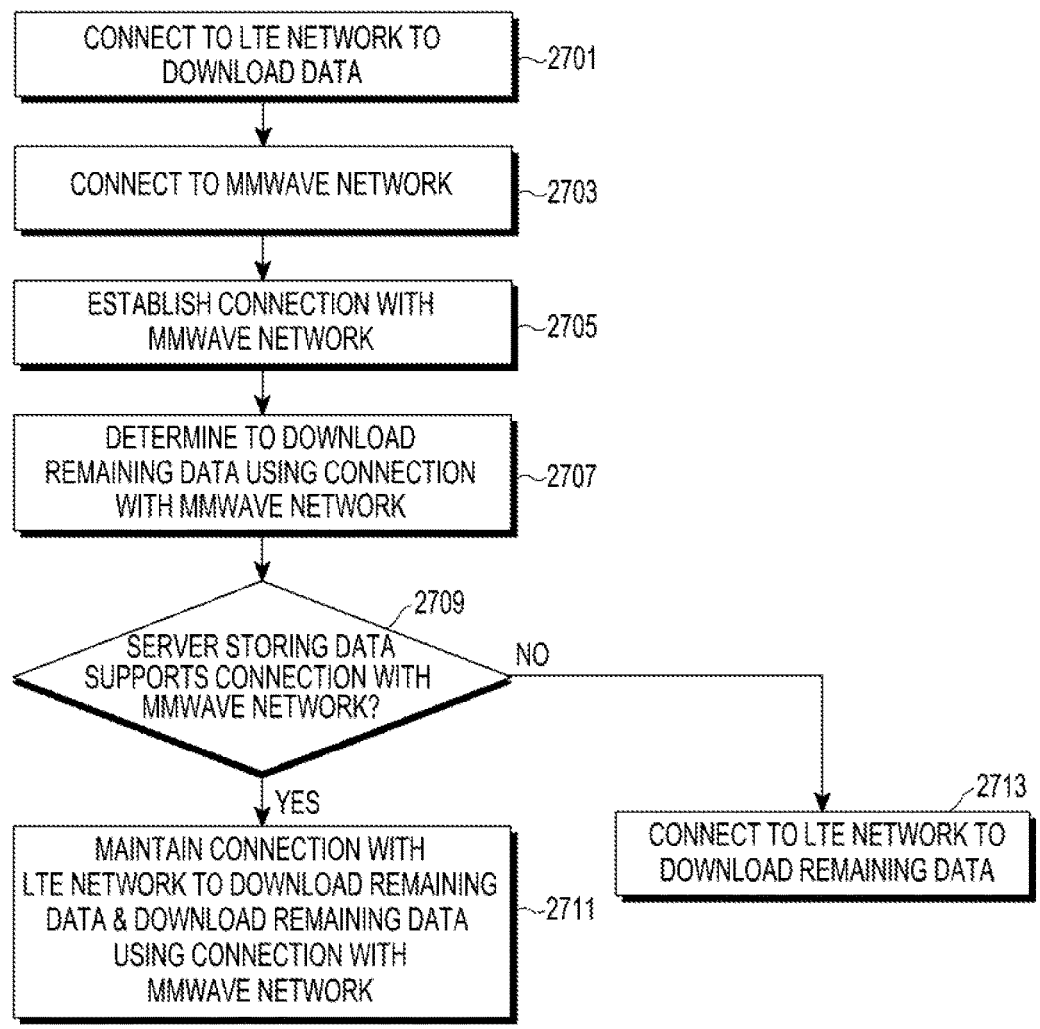
FIG. 27 is a flowchart illustrating operations performed by a terminal when the terminal connects to a mmWave network while the terminal is connected with an LTE network to download data according to an embodiment of the present disclosure.

FIG. 27 is a flowchart illustrating operations performed by a terminal when the terminal connects to a mmWave network while the terminal is connected with an LTE network to download data according to an embodiment of the present disclosure.

Referring to FIG. 27, the terminal connects to the LTE network to download data in operation 2701.

In operation 2703, the terminal connects to the mmWave network (condition 3 of Table 1).

In operation 2705, the terminal establishes a connection with the mmWave network. For future reconnection with the mmWave network, the terminal may store parameters for the mmWave network.

In operation 2707, the terminal determines to download the remaining data using the connection with the mmWave network.

In operation 2709, the terminal identifies whether a server storing the data supports the connection with the mmWave network.

When the server supports the connection with the mmWave network, the terminal maintains the connection with the LTE network to download the remaining data in operation 2711. The terminal simultaneously starts to download the remaining data using the connection with the mmWave network.

However, when the server does not support connection with the mmWave network, the terminal remains connected to the LTE network to download the remaining data in operation 2713.

Figure 28:
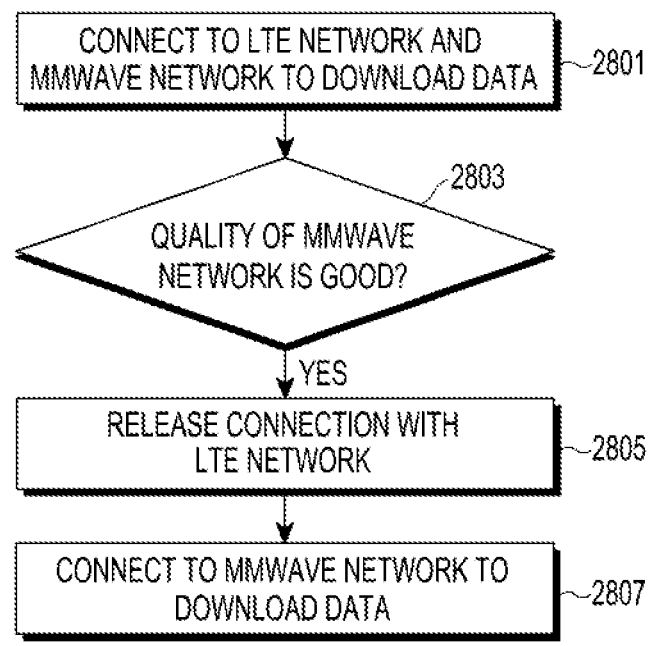
FIG. 28 is a flowchart illustrating a handover to a mmWave network is performed by a terminal while the terminal downloads data through an LTE network and the mmWave network according to an embodiment of the present disclosure.

FIG. 28 is a flowchart illustrating a handover to a mmWave network is performed by a terminal while the terminal downloads data through an LTE network and the mmWave network according to an embodiment of the present disclosure.

Referring to FIG. 28, the terminal connects to the LTE network and mmWave network to download data in operation 2801.

In operation 2803, the terminal determines that the mmWave network is of good quality (condition 4 of Table 1).

In operation 2805, the terminal releases the connection with the LTE network.

In operation 2807, the terminal stays connected with the mmWave network to download data.

Figure 29:
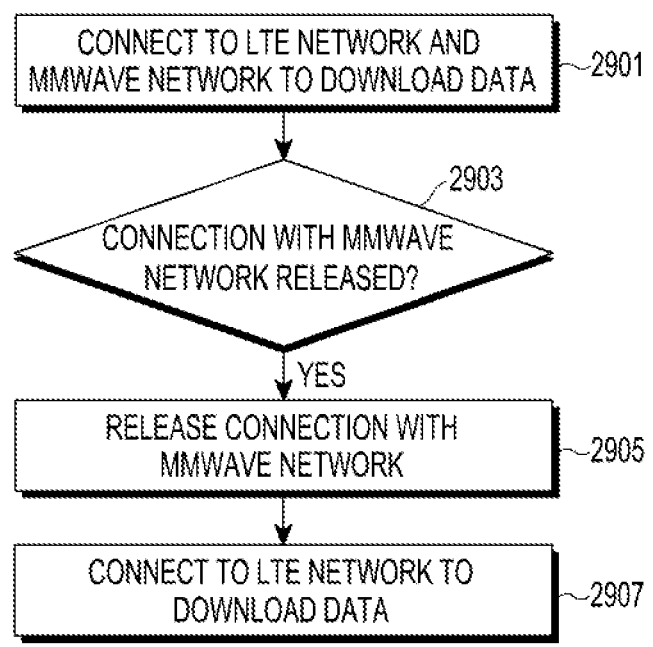
FIG. 29 is a flowchart illustrating a handover to an LTE network by a terminal while the terminal downloads data through the LTE network and a mmWave network according to an embodiment of the present disclosure.

FIG. 29 is a flowchart illustrating a handover to an LTE network by a terminal while the terminal downloads data through the LTE network and a mmWave network according to an embodiment of the present disclosure.

Referring to FIG. 29, the terminal connects to the LTE network and mmWave network to download data in operation 2901.

In operation 2903, the terminal determines that the connection with the mmWave network is released (condition 2 of Table 1).

In operation 2905, the terminal releases the connection with the mmWave network.

In operation 2907, the terminal remains connected with the LTE network to download data.

Figure 30:
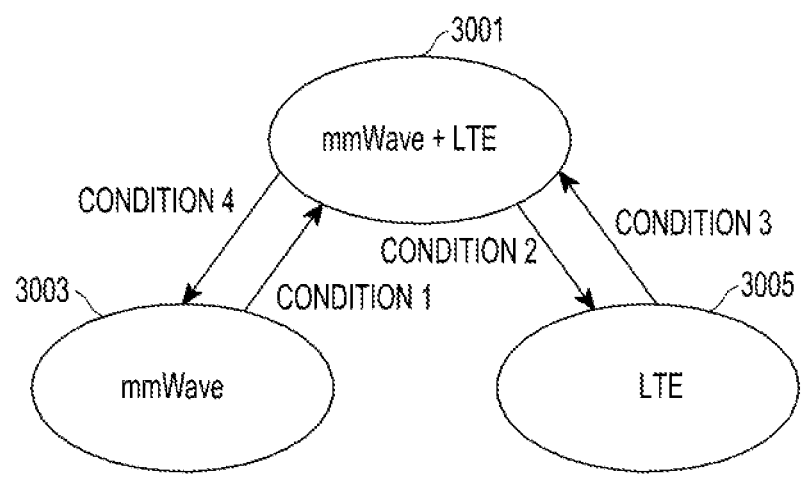
FIG. 30 is a state diagram illustrating a network used when a terminal transmits data according to an embodiment of the present disclosure.

FIG. 30 is a state diagram illustrating a network used when a terminal transmits data according to an embodiment of the present disclosure.

Referring to FIG. 30, the terminal uploads data using the currently connected network while sending test data using another network, i.e., a newly connected network (3001).

When determining that condition 2 of Table 1 is met, the terminal uploads data using only the LTE network (3005). Thereafter, when determining that condition 3 of Table 1 is met, the terminal continues to use the LTE network to upload data while sending test data using the other network, i.e., the mmWave network (3001).

Selectively, when determining that condition 4 of Table 1 is met, the terminal uploads data using only the mmWave network (3003). Thereafter, when determining that condition 1 of Table 1 is met, the terminal continues to use the mmWave network to upload data while sending test data using the other network, i.e., the LTE network (3001).

Table 1 above may also be available upon uploading data. However, the variables meeting the conditions may differ. In other words, although Table 1 above simply shows PER, the PER may differ between downlinking and uploading.

FIGS. 31A to 31D are views illustrating whether a terminal connected with an LTE network performs a handover and a network used for uploading data according to an embodiment of the present disclosure.

Figure 31A:
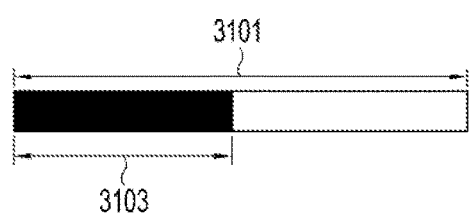
FIGS. 31A to 31D are views illustrating whether a terminal connected with an LTE network performs a handover and a network used for uploading data according to an embodiment of the present disclosure.

FIG. 31A illustrates data to be uploaded by the terminal connected with the LTE network. Since the terminal is connected with the LTE network, the overall data 3101 may be uploaded via the LTE network. Some data 3103 of the overall data 3101 denotes data already uploaded through the LTE network. Thereafter, the terminal may connect to the mmWave network which corresponds to condition 3 of Table 1. Here, the terminal is in the state 3001 of FIG. 30.

Figure 31B:
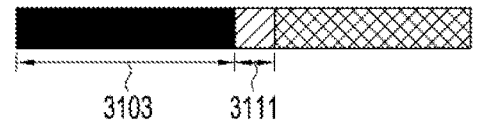

FIG. 31B illustrates data 3111 uploaded while the terminal measures the quality of the mmWave network. The terminal uploads the data using the LTE network. The quality of the mmWave network measured by the terminal may be determined by the operation of uploading data for AP, PER, or signal strength or detecting a server to measure the uploading speed.

Figure 31C:
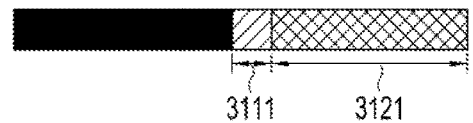

FIG. 31C illustrates which network the terminal staying in state 3001 is to use for uploading the remaining data when the terminal meets condition 2. In other words, since the connection between the terminal and the mmWave network is resultantly released, the terminal uploads the remaining data 3121 via the LTE network.

Figure 31D:
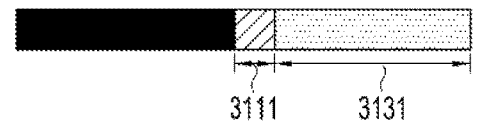

FIG. 31D illustrates which network the terminal staying in state 3001 is to use for uploading the remaining data 3131 when the terminal meets condition 4. Since the mmWave network is of good quality, the terminal may upload the remaining data 3131 through the mmWave network.

However, unless the terminal in the state 3001 meets condition 2 or 4, the terminal may continue to measure the quality of the mmWave network while uploading the data through the LTE network.

FIGS. 32A to 32D are views illustrating whether a terminal connected with a mmWave network performs a handover and a network used for uploading data according to an embodiment of the present disclosure.

Figure 32A:
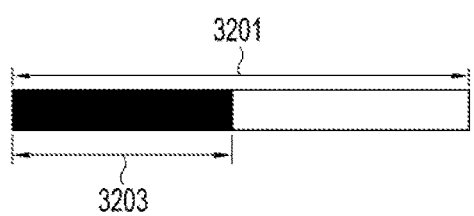
FIGS. 32A to 32D are views illustrating whether a terminal connected with a mmWave network performs a handover and a network used for uploading data according to an embodiment of the present disclosure.

FIG. 32A illustrates data 3201 to be uploaded by the terminal connected with the mmWave network. In principle, since the terminal is connected with the mmWave network, the overall data 3201 may be uploaded via the mmWave network. Some data 3203 of the overall data 3201 denotes data already uploaded through the mmWave network. Thereafter, the terminal may predict that the connection with the mmWave network is to be released (i.e., condition 1 of Table 1). Here, the terminal is in the state 3001 of FIG. 30.

Figure 32B:
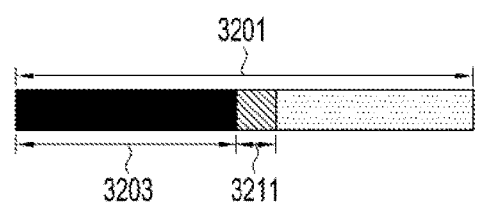

FIG. 32B illustrates a network to which the terminal in the state 3001 may connect when the terminal uploads the remainder of the overall data 3201. The terminal, when the connection with the mmWave network is not released, may connect to the LTE network while maintaining the connection with the mmWave network. Thus, some 3211 of the remaining data is uploaded via the mmWave network while the terminal monitors the state of connection with the mmWave network.

Figure 32C:

FIG. 32C illustrates which network the terminal staying in state 3001 is to use for uploading the remaining data 3221 when the terminal meets condition 2. When the connection with the mmWave network is released before fully uploading the remaining data, the terminal connects to the LTE network to upload the remaining data 3221.

Figure 32D:

FIG. 32D illustrates which network the terminal staying in state 3001 is to use for uploading the remaining data 3231 when the terminal meets condition 4. Since the mmWave network is of good quality, the terminal may upload the remaining data 3231 through the mmWave network. In this case, all the data 3201 ends up being uploaded via the mmWave network.

Figure 33:
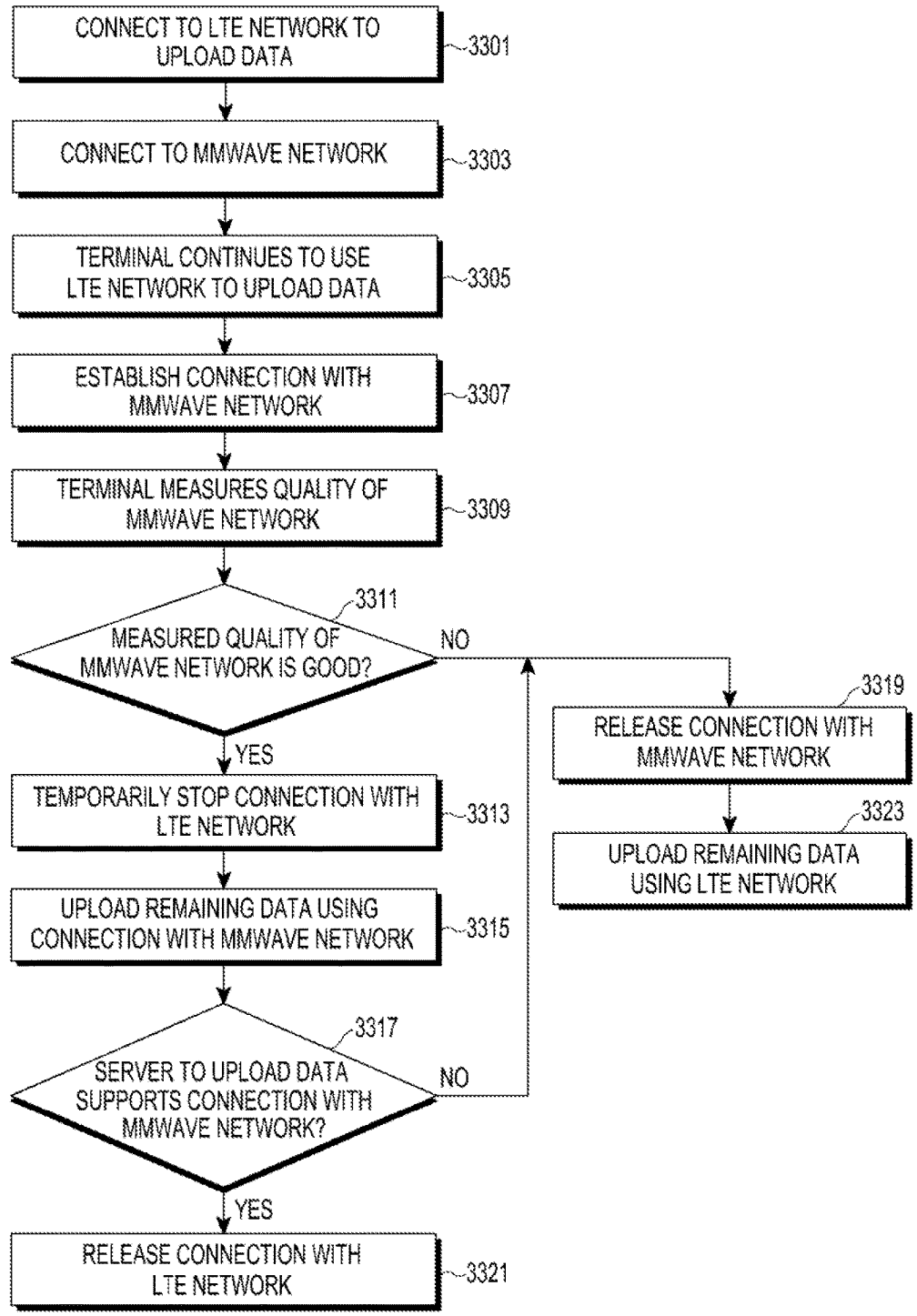
FIG. 33 is a flowchart illustrating operations performed by a terminal when the terminal connects to a mmWave network while the terminal is connected with an LTE network to upload data according to an embodiment of the present disclosure.

FIG. 33 is a flowchart illustrating operations performed by a terminal when the terminal connects to a mmWave network while the terminal is connected with an LTE network to upload data according to an embodiment of the present disclosure.

Referring to FIG. 33, the terminal connects to the LTE network to upload data in operation 3301.

In operation 3303, the terminal connects to the mmWave network (condition 3 of Table 1).

In operation 3305, the terminal continues to use the LTE network to maintain the uploading of the data.

In operation 3307, the terminal establishes a connection with the mmWave network.

In operation 3309, the terminal measures the quality of the mmWave network.

In operation 3311, the terminal determines whether the measured quality of the mmWave network is good.

In operation 3313, when the measured quality of the mmWave network is good, the terminal temporarily stops connection with the LTE network.

In operation 3315, the terminal uploads the remaining data using the connection with the mmWave network.

In operation 3317, the terminal determines whether the server to upload the data supports connection with the mmWave network.

In operation 3321, the terminal, when the server supports connection with the mmWave network, releases the connection with the LTE network.

When the measured quality of the mmWave network is not good or the server does not support connection with the mmWave network, the terminal releases the connection with the mmWave network in operation 3319.

In operation 3323, the terminal uploads the remaining data using the LTE network.

Figure 34A:
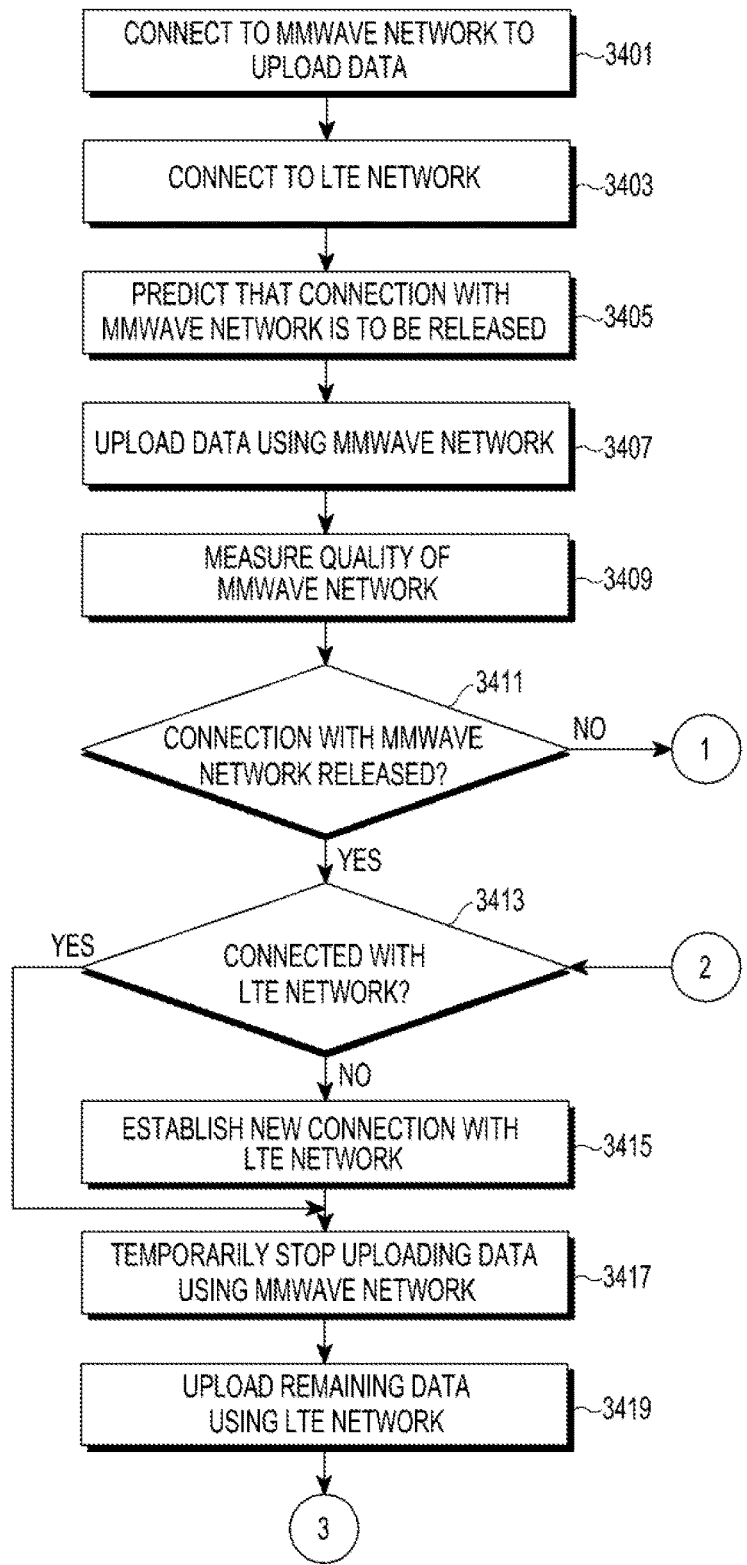
FIGS. 34A to 34C are flowcharts illustrating operations performed by a terminal when a mmWave network is not in a good state while the terminal is connected with the mmWave network to upload data according to an embodiment of the present disclosure.
Figure 34B:
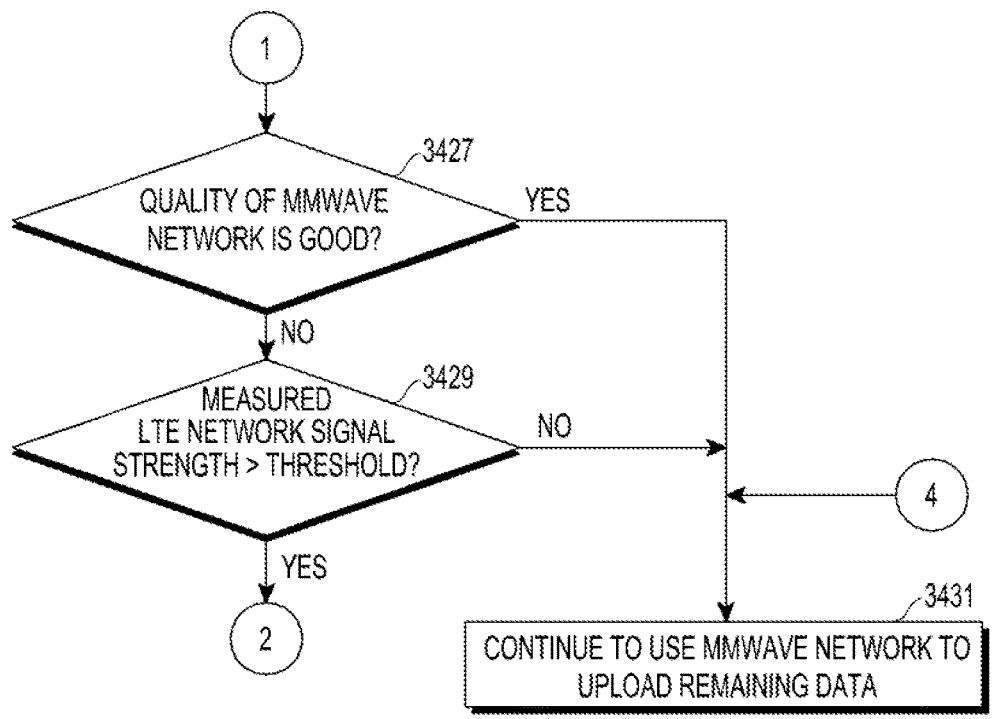
Figure 34C:
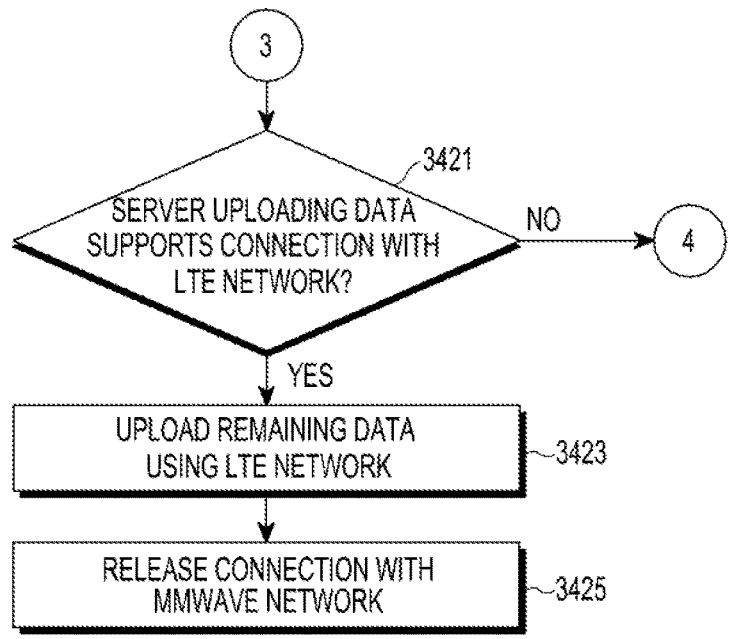

FIGS. 34A to 34C are flowcharts illustrating operations performed by a terminal when a mmWave network is not in a good state while the terminal is connected with the mmWave network to upload data according to an embodiment of the present disclosure.

Referring to FIGS. 34A to 34C, the terminal connects to the mmWave network to upload data in operation 3401.

In operation 3403, the terminal preliminarily connects to the LTE network. This state may be referred to as an idle connection to the LTE network.

In operation 3405, the terminal may predict that the connection with the mmWave network is to be released (condition 2 of Table 1).

In operation 3407, the terminal continues to use the mmWave network to upload the data.

In operation 3409, the terminal measures the quality of the mmWave network.

In operation 3411, the terminal determines whether the connection with the mmWave network is released based on the measured quality of mmWave network.

When the connection with the mmWave network is determined to be released, the terminal determines whether the terminal is connected with the LTE network in operation 3413.

Unless the terminal is connected with the LTE network, the terminal establishes a new connection with the LTE network in operation 3415.

When the terminal determines that the terminal is connected with the LTE network in operation 3413 or when the terminal establishes a new connection with the LTE network in operation 3415, the terminal temporarily stops uploading the data using the mmWave network in operation 3417.

In operation 3419, the terminal uploads the remaining data using the LTE network.

In operation 3421, the terminal determines whether the server uploading the data supports connection with the LTE network.

When the server supports connection with the LTE network, the terminal uploads the remaining data using the LTE network in operation 3423.

In operation 3425, the terminal releases the connection with the mmWave network.

In operation 3411, when determining that the connection with the mmWave network is not released, the terminal determines whether the quality of the mmWave network is good in operation 3427.

When the quality of the mmWave network is determined to be not good, the terminal measures the strength of LTE network signals and determines whether the measured strength is larger than a predetermined threshold in operation 3429.

When the measured strength of LTE network signals is larger than the threshold, the terminal performs operation 3413.

However, when the measured strength of the LTE network signals is smaller than the threshold, when the quality of the mmWave network is determined in operation 3427 to be good, or when the server does not support connection with the LTE network in operation 3421, the terminal performs operation 3431.

In operation 3431, the terminal continues to use the mmWave network to upload the remaining data.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for performing a handover by a terminal in a wireless communication system, the method comprising:
measuring a first signal quality of a first network;
determining whether a handover to a second network from the first network is required based on the first signal quality;
when the handover is determined to be required, communicating data through both a connection with the first network and a connection with the second network;
measuring a second signal quality of the first network;
determining whether to perform the handover based on the second signal quality; and
performing the handover based on the determination of whether to perform the handover.

2. The method of claim 1, wherein the first network comprises a millimeter wave (mmWave) network.

3. The method of claim 1, further comprising:
storing a parameter related to the first network.

4. The method of claim 3, wherein a recovery to the first network is performed using the stored parameter.

5. The method of claim 3, wherein the stored parameter related to the first network includes a second parameter related to an application layer of the terminal.

6. The method of claim 1, wherein the determining of whether to perform the handover includes, when the second signal quality is smaller than a first threshold, determining to release the connection with the first network.

7. The method of claim 6, wherein the determining of whether to perform the handover includes, when the second signal quality is larger than the first threshold and smaller than a second threshold, and multiple quality values measured during a predetermined period are smaller than corresponding previous multiple quality values, determining to release the connection with the first network.

8. The method of claim 1, wherein the determining of whether to perform the handover based on the second signal quality comprises:
converting at least one of a received signal strength indicator (RSSI), a bandwidth (BW), a packet error rate (PER), a temperature of the terminal, and a battery usage of the terminal into a numerical value; and
determining whether to perform the handover using the numerical value as the second signal quality.

9. The method of claim 1, wherein a predetermined time interval ends when meeting at least one of when a predetermined period elapses, when a predetermined amount of data is downloaded or uploaded, when the second signal quality is a predetermined level or higher, or when the second signal quality is the predetermined level or lower.

10. The method of claim 9, wherein the predetermined period or the predetermined amount of data is determined using a bandwidth of the first network.

11. A device for performing a handover in a wireless communication system, the device comprising:
at least one processor; and
at least one memory storing one or more computer programs configured to be executed by the at least one processor, the one or more computer programs including instructions to:
measure a first signal quality of a first network,
determine whether a handover to a second network from the first network is required based on the first signal quality,
when the handover is determined to be required, communicate data through both a connection with the first network and a connection with the second network,
measure a second signal quality of the first network,
determine whether to perform the handover based on the second signal quality, and
perform the handover based on the determination of whether to perform the handover.

12. The device of claim 11, wherein the first network comprises a millimeter wave (mmWave) network.

13. The device of claim 11, wherein the one or more computer programs further include instructions to store a parameter related to the first network.

14. The device of claim 13, wherein a recovery to the first network is performed using the stored parameter.

15. The device of claim 13, wherein the stored parameter related to the first network includes a second parameter related to an application layer of the device.

16. The device of claim 11, wherein the one or more computer programs further include instructions to, when the second signal quality is smaller than a first threshold, determine to release the connection with the first network.

17. The device of claim 16, wherein the one or more computer programs further include instructions to, when the second signal quality is larger than the first threshold and smaller than a second threshold, and multiple quality values measured during a predetermined period are smaller than corresponding previous multiple quality values, determine to release the connection with the first network.

18. The device of claim 11, wherein the one or more computer programs further include instructions to:
convert at least one of a received signal strength indicator (RSSI), a bandwidth (BW), a packet error rate (PER), a temperature of the device, and a battery usage of the device into a numerical value, and
determine whether to perform the handover using the numerical value as the second signal quality.

19. The device of claim 11, wherein a predetermined time interval ends when meeting at least one of when a predetermined period elapses, when a predetermined amount of data is downloaded or uploaded, when the second signal quality is a predetermined level or higher, or when the second signal quality is the predetermined level or lower.

20. The device of claim 19, wherein the predetermined period or the predetermined amount of data is determined using a bandwidth of the first network.

* * * * *